(12) United States Patent
Watanabe

(10) Patent No.: US 6,341,026 B1
(45) Date of Patent: *Jan. 22, 2002

(54) OPTICAL COMMUNICATION SYSTEM USING OPTICAL PHASE CONJUGATION TO SUPPRESS WAVEFORM DISTORTION CAUSED BY CHROMATIC DISPERSION AND OPTICAL KERR EFFECT

(75) Inventor: Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/660,471

(22) Filed: Sep. 12, 2000

Related U.S. Application Data

(63) Continuation of application No. 08/724,650, filed on Oct. 1, 1996, now Pat. No. 6,175,435.

(30) Foreign Application Priority Data

Nov. 22, 1995 (JP) ............................................. 7-304229

(51) Int. Cl.[7] ............................................. H04B 10/00
(52) U.S. Cl. ...................................... 359/161; 359/173
(58) Field of Search .............................. 359/161, 173, 359/124, 188, 195; 385/122

(56) References Cited

U.S. PATENT DOCUMENTS

| | | | |
|---|---|---|---|
| 5,365,362 A | * 11/1994 | Gnauck et al. | 359/174 |
| 5,400,164 A | 3/1995 | Kurtzke et al. | 359/156 |
| 5,532,868 A | * 7/1996 | Gnauck et al. | 359/332 |
| 5,694,239 A | * 12/1997 | Shigematsu et al. | 359/332 |
| 5,754,334 A | 5/1998 | Artiglia et al. | 359/332 |
| 5,798,853 A | 8/1998 | Watanabe | 359/160 |
| 6,160,942 A | * 12/2000 | Watanabe | 385/122 |
| 6,175,435 B1 | * 1/2001 | Watanabe | 359/161 |

OTHER PUBLICATIONS

S. Watanabe, et al.; "Cancellation of Four–Wave Mixing in Multichannel Fibre Transmission By Midway Optical Phase Conjugation"; Electronic Letters, Jul. 7, 1994, vol. 30, No. 14, pp. 1156–1157.

Watanabe, S., "Compensation of the phase fluctuation in a transmission line by optical phase conjugation," *Optics Letters*, vol. 17, No. 19, Oct. 1, 1992, pp. 1355–1357 (Reprinted).

Watanabe et al., "Compensation of Chromatic Dispersion in a Single–Mode Fiber by Optical Phase Conjugation," *IEEE Photonics Technology Letters*, vol. 5, No. 1, Jan. 1993, pp. 92–95.

Watanabe et al., "Compensation of Pulse Shape Distortion Due to Chromatic Dispersion and Kerr Effect by Optical Phase Conjugation," *IEEE Photonics Technology Letters*, vol. 5, No. 10, Oct. 1993, pp. 1241–1243 (Reprinted).

Watanabe et al., "Exact Compensation for both Chromatic Dispersion and Kerr Effect in a Transmission Fiber Using Optical Phase Conjugation," *Journal Of Lightwave Technology*, vol. 14, No. 3, Mar. 1996, pp. 243–248 (Reprinted).

\* cited by examiner

*Primary Examiner*—Kinfe-Michael Negash
(74) *Attorney, Agent, or Firm*—Staas & Halsey LLP

(57) ABSTRACT

An optical communication system which uses optical phase conjugation to compensate for chromatic dispersion and optical Kerr effect. The optical communication system includes a first fiber, a phase conjugator, and a second fiber. The first fiber transmits a light signal therethrough, and is a polarization maintaining fiber. The light signal is a linear polarized wave. The phase conjugator receives the light signal from the first fiber and produces a corresponding phase conjugate light signal. The second fiber receives the phase conjugate light signal from the phase conjugator and transmits the phase conjugate light signal therethrough. A wavelength division multiplexing optical communication system is also provided which uses optical phase conjugation to compensate for dispersion and optical Kerr effect.

3 Claims, 13 Drawing Sheets

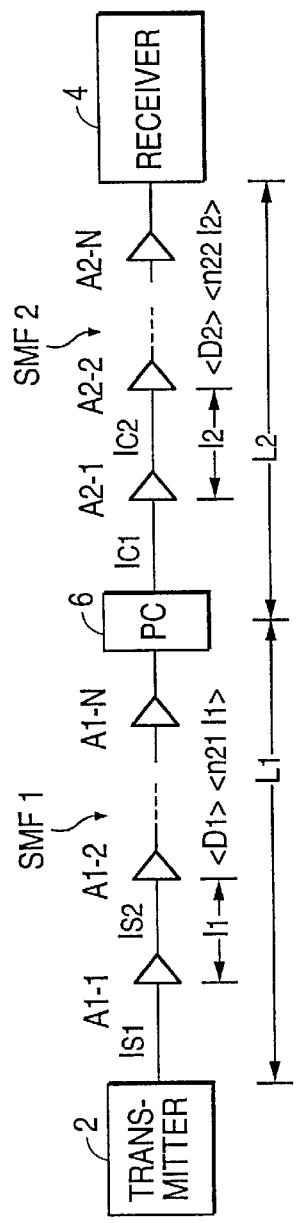
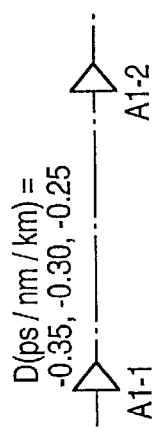
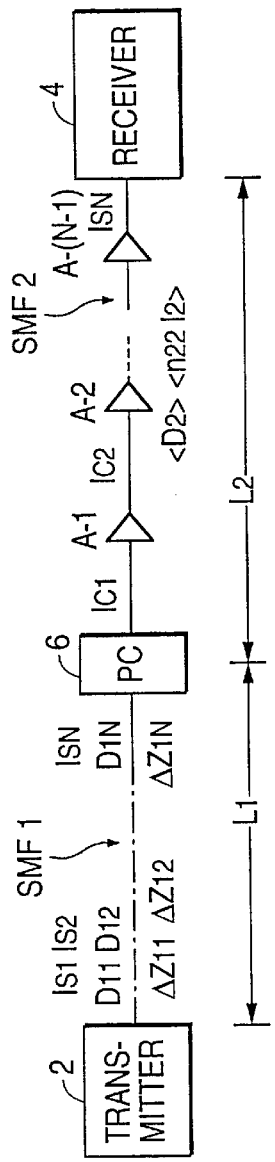

US 6,341,026 B1

OPTICAL COMMUNICATION SYSTEM USING OPTICAL PHASE CONJUGATION TO SUPPRESS WAVEFORM DISTORTION CAUSED BY CHROMATIC DISPERSION AND OPTICAL KERR EFFECT

CROSS-REFERENCE TO RELATED APPLICATIONS

This application is based on, and claims priority to, Japanese patent application number 07-304229, filed on Nov. 22, 1995, in Japan, and which is incorporated herein by reference.

This application is related to U.S. application Ser. Nos. 08/244,995, 08/135,626, 08/392,337, 08/535,342, 08/468,183 and 08/539,788, which are incorporated herein by reference. This Application is a continuation of Ser. No. 08/724,650 Oct. 1, 1996 U.S. Pat. No. 6,175,435.

BACKGROUND OF THE INVENTION

1. Field of the Invention

The present invention relates to an optical communication system using optical phase conjugation to suppress waveform distortion caused by chromatic dispersion or group velocity dispersion (GVD) and the optical Kerr effect and, more particularly, to the use of a polarization maintaining fiber in such an optical communication system and to the transmission of a wavelength division multiplexed (WDM) light signal in such an optical communication system.

2. Description of the Related Art

Optical communication systems typically transmit optical signals through a fiber (or "optical fiber") over long distances of several hundred to several thousand kilometers, and with transmission speeds as high as several Gb/sec to 10 Gb/sec or more. However, the transmission quality of the optical signals travelling through the fiber can significantly deteriorate due to GVD in the fiber. As a result, the transmission speed and/or transmission distance is usually limited by the effect of GVD.

Moreover, intensity modulation or amplitude modulation is used to produce a signal light having a waveform of optical pulses. However, the resulting waveform may be distorted for reasons other than GVD. For example, waveform distortion can be caused by GVD and the optical Kerr effect.

The following is a discussion of the relationship of GVD to the optical Kerr effect. Assume that an optical pulse propagates in a dispersive medium. When an unchirped pulse passes through a normal dispersion medium ($\partial^2\beta/\partial\omega^2 > 0$, where $\beta$ and $\omega$ denote the propagation constant and the angular frequency of the light, respectively), the pulse is shifted toward a lower frequency side at its rising edge and is shifted toward a higher frequency side at its falling edge. By contrast, in the case of an abnormal dispersion medium ($\partial^2\beta/\partial\omega^2 < 0$), the pulse is shifted toward a higher frequency side at its rising edge and is shifted toward a lower frequency side at its falling edge.

Further, in a normal dispersion medium, the longer the wavelength, the higher the group velocity. By contrast, in an anomalous dispersion medium, the shorter the wavelength, the higher the group velocity. Therefore, in either case, the pulse width is increased.

When the light intensity is great, the refractive index is changed by the following value due to the optical Kerr effect.

$$\Delta n(t) = n_2 |E(t)|^2 \quad \text{Equation (1)}$$

In the above Equation (1), $n_2$ is the nonlinear refractive index. For example, with a silica fiber, the nonlinear refractive index $n_2$ is approximately $3.2 \times 10^{-20}$ m²/W.

When an optical pulse is affected by the optical Kerr effect in a nonlinear medium, the spectrum is chirped as shown by the following Equation (2).

Equation (2):

$$\Delta\omega(t) = -\frac{\partial \Delta\Phi(t)}{\partial t} = -\frac{2\pi n_2}{\lambda} \frac{\partial |E(t)|^2}{\partial t} \Delta z$$

where $\Delta z$ denotes the interaction length. This phenomenon is generally termed self-phase modulation (SPM).

Due to SPM, the optical pulse is shifted to a lower frequency side at its rising edge and is shifted toward a higher frequency side at its falling edge. Because of the chirping caused by such SPM, the influence of the dispersion is rendered more noticeable, thereby increasing the pulse distortion.

Therefore, when the optical pulse is affected by the optical Kerr effect in a normal dispersion medium, the pulse broadens more than in the case of dispersion alone. Moreover, in an anomalous dispersion medium, pulse compression occurs. An optical soliton is obtained by counter-balancing GVD and SPM.

In an anomalous dispersion medium, a high signal-to-noise ratio can be advantageously retained by applying pulse compression derived from SPM. However, recent research developments enable satisfactory transmission with high-level optical power by the use of an optical amplifier and a dispersion-shifted fiber (DSF) having a relatively small GVD. Therefore, it is uncertain whether pulse compression will provide improved results. In other words, large waveform distortion is generated as the pulse compression effect is rendered excessive. Particularly in the case of non-return to zero (NRZ) pulses, concentrative pulse compression occurs at rising and falling portions of the pulses, so that severe waveform changes are induced. In an extreme case, a falling portion passes a rising portion to eventually cause a phenomenon that one pulse is split into several pulses.

In view of the above, significant waveform distortion occurs from GVD and the optical Kerr effect. Such waveform distortion can be reduced by using conventional fibers having approximately zero dispersion at wavelength regions of 1.3 μm and 1.55 μm. However, without other countermeasures and due to GVD and the optical Kerr effect, such fibers may not adequately suppress waveform distortion.

SUMMARY OF THE INVENTION

Accordingly, it is an object of the present invention to provide an optical communication system, such as a wavelength division multiplexing (WDM) optical communication system, which suppresses waveform distortion caused by GVD and the optical Kerr effect.

It is a further object of the present invention to provide an optical communication system which uses optical phase conjugation (OPC) and a polarization maintaining fiber to reduce variations of polarization, to thereby suppress waveform distortion derived from GVD and the optical Kerr effect.

It is an additional object of the present invention to provide an optical communication system which maintains an optimal state of reception despite variation of polarization in the optical communication system.

Objects of the present invention are achieved by providing an apparatus for transmitting a light signal. The apparatus includes a first fiber, a phase conjugator, and a second fiber. The first fiber transmits the light signal therethrough, and is a polarization maintaining fiber. The light signal is a linear polarized wave. The phase conjugator receives the light signal from the first fiber and produces a corresponding phase conjugate light signal. The second fiber receives the phase conjugate light signal from the phase conjugator and transmits the phase conjugate light signal therethrough.

Objects of the present invention are also achieved by (a) setting the amount of dispersion of the first fiber to be substantially equal to the amount of dispersion of the second fiber, and (b) setting the amount of the optical Kerr effect of the first fiber to be substantially equal to the amount of the optical Kerr effect of the second fiber.

Objects of the present invention are also achieved by (a) setting the ratio of the dispersion of the first fiber to the dispersion of the second fiber to be substantially equal to the ratio of the length of the second fiber to the length of the first fiber, and (b) setting the ratio of the product of the optical frequency, the light intensity and the nonlinear refractive index of the first fiber to the product of the optical frequency, the light intensity and the nonlinear refractive index of the second fiber to be substantially equal to the ratio of the length of the second fiber to the length of the first fiber.

In addition, objects of the present invention are achieved by dividing the first fiber into a plurality of sections which each have an associated dispersion and an optical Kerr effect, and dividing the second fiber into a plurality of sections which each have an associated dispersion and an optical Kerr effect and which correspond, respectively, to the plurality of sections of the first fiber, wherein (a) the amount of dispersion in each section of the plurality of sections of the first fiber is set to be substantially equal to the amount of dispersion of the corresponding section of the plurality of sections of the second fiber, and (b) the amount of optical Kerr effect in each section of the plurality of sections of the first fiber is set to be substantially equal to the amount of optical Kerr effect of the corresponding section of the plurality of sections of the second fiber.

Further, objects of the present invention are achieved by dividing the first fiber into a plurality of sections which each have an associated dispersion, length, light intensity, and nonlinear refractive index, and dividing the second fiber into a plurality of sections which each have an associated dispersion, length, light intensity, and nonlinear refractive index, and which correspond, respectively, to the plurality of sections of the first fiber. The ratio of the dispersion in each section of the plurality of sections of the first fiber to the dispersion of the corresponding section of the plurality of sections of the second fiber is set to be substantially equal to the ratio of the length of the respective section of the plurality of sections of the second fiber to the length of the respective section of the plurality of sections of the first fiber. In addition, the ratio of the product of the optical frequency, the light intensity and the nonlinear refractive index of each section of the plurality of sections of the first fiber to the product of the optical frequency, the light intensity and the nonlinear refractive index of the corresponding section of the plurality of sections of the second fiber is set to be substantially equal to the ratio of the length of the respective section of the plurality of sections of the second fiber to the length of the respective section of the plurality of sections of the first fiber.

Objects of the present invention are also achieved by providing a monitoring unit which monitors a parameter of the phase conjugate light signal transmitted in the second fiber and indicating the reproduction quality of the transmission data, and controls at least one of the wavelength and power of pump light of a pump source of the phase conjugator to optimize the reproduction quality of the transmission data.

Moreover, objects of the present invention are achieved by providing an apparatus which uses phase conjugation to transmit a wavelength division multiplexed light signal. More specifically, a first fiber transmits the wavelength division multiplexed light signal therethrough. A demultiplexer receives the wavelength division multiplexed light signal from the first fiber and separates the wavelength division multiplexed into a plurality of separate light signals. A plurality of phase conjugators correspond, respectively, to the plurality of separate light signals. Each phase conjugator receives the corresponding separate light signal from the demultiplexer and produces a corresponding phase conjugate light signal, to thereby produce a plurality of phase conjugate light signals. A plurality of second fibers correspond, respectively, to the plurality of phase conjugate light signals. Each second fiber receives the corresponding phase conjugate light signal and transmits the received phase conjugate light signal therethrough.

Additional objects and features of the invention will be set forth in part in the description which follows, and, in part, will be obvious from the description, or may be learned by practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 11 is a diagram illustrating an optical communication system according to an embodiment of the invention.

FIG. 12 is a diagram illustrating dispersion control in an average intensity method, according to an embodiment of the present invention.

FIG. 13 is a diagram illustrating an optical communication system according to an embodiment of the invention.

DESCRIPTION OF THE PREFERRED EMBODIMENTS

Figure 1:
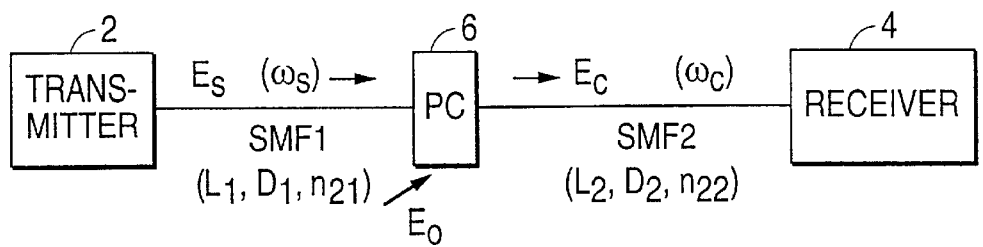
FIG. 1 a diagram illustrating the use of a phase conjugator, according to an embodiment of the present invention.

Reference will now be made in detail to the present preferred embodiments of the present invention, examples of which are illustrated in the accompanying drawings, wherein like reference numerals refer to like elements throughout.

FIG. 1 a diagram illustrating the use of a phase conjugator, according to an embodiment of the present invention. Referring now to FIG. 1, a transmitter 2 generates a signal light beam $E_s$ by modulating light with transmission data. The signal light beam $E_s$ is transmitted through a first optical fiber SMF1 (length $L_1$, dispersion $D_1$, nonlinear refractive index $n_{21}$) to a phase conjugator (PC) 6 disposed at an intermediate position along a transmission line. In the phase conjugator 6, the signal light beam $E_s$ is transformed into a phase conjugate light beam $E_c$ by the use of a pump light beam $E_o$, and is then transmitted to a receiver 4 through a second optical fiber SMF2 (length $L_2$, dispersion $D_2$, nonlinear refractive index $n_{22}$). The receiver 4 receives the phase conjugate light beam by via a photo detector (not illustrated), to detect the transmission data. Such detection of the transmission data is performed, for example, through direct detection after extraction of the phase conjugate light beam via a band pass filter (not illustrated), or by heterodyne detection.

The first and second optical fibers SMF1 and SMF2 are, for example, silica fiber which are 1.3 μm zero dispersion shifted fibers or 1.55 μm dispersion shifted fibers.

The signal light beam $E_s$ may be produced by frequency (wavelength) division multiplexing a plurality of signal lights obtained from a plurality of light sources of mutually different frequencies. Thus, the signal light beam $E_s$ can be a wavelength division multiplexed (WDM) signal light.

The phase conjugator 6 includes a second-order or third-order nonlinear optical medium (not illustrated). The signal light beam $E_s$ and the pump light beam $E_o$ from a pump light source (not illustrated) are provided in the phase conjugator 6 to the nonlinear optical medium. When the phase conjugator 6 uses a second-order optical medium, the phase conjugator 6 generates a phase conjugate light beam by parametric effect. When the phase conjugator 6 uses a third-order optical medium, the phase conjugator 6 generates a phase conjugate light beam by degenerate or nondegenerate four-wave mixing. A third-order nonlinear optical medium may be, for example, a silica optical fiber. With a silica optical fiber, it is possible to generate a satisfactory phase conjugate light beam by selectively presetting the pump light wavelength in four-wave mixing approximately to the zero dispersion wavelength of the optical fiber.

Figure 2:
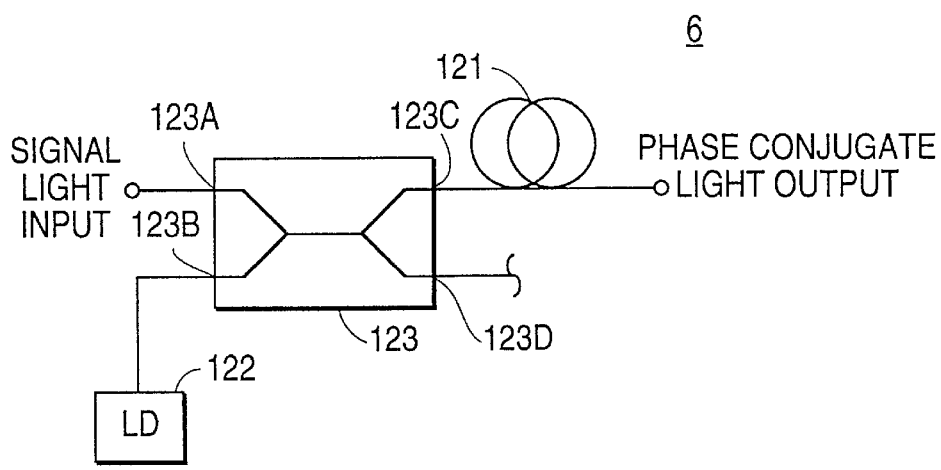
FIG. 2 is a diagram illustrating a phase conjugator, according to an embodiment of the present invention.

FIG. 2 is a diagram illustrating the phase conjugator 6, according to an embodiment of the present invention. Referring now to FIG. 2, the phase conjugator 6 comprises an optical fiber 121 as a nonlinear optical medium, a laser diode 122 as a pump light source, and an optical coupler 123 for combining the signal light beam and the pump light beam to the optical fiber 121.

Preferably, the optical fiber 121 is a single mode fiber. In this case, for execution of nondegenerate four-wave mixing by determining the wavelength of the signal light beam and that of the pump light beam to be slightly different from each other, it is arranged so that the-wavelength for providing zero dispersion of the optical fiber 121 becomes coincident with the pump light wavelength (oscillation wavelength of the laser diode 122).

The optical coupler 123 has four ports 123A, 123B, 123C and 123D. The port 123A is connected to the first optical fiber SMF1 (see FIG. 1). The port 123B is connected the laser diode 122. The port 123C is connected the first end of the optical fiber 121. The port 123D is a dead end. The second end-of the optical fiber 121 is connected to the second optical fiber SMF2 (see FIG. 1). Light supplied to the ports 123A and 123B is output from the port 123C. The optical coupler 123 may be of fiber fused type or may comprise of a half mirror (not illustrated), a wavelength division multiplexer (not illustrated) or a polarized beam splitter (not illustrated).

According to the above embodiments of the present invention, the signal light beam is supplied to the port 123A of the optical coupler 123 and is combined with the pump light beam supplied to the port 123B. The combined light beam is provided to nonlinear optical fiber 121, to thereby transform the signal light beam into a phase conjugate light beam by four-wave mixing.

Figure 3:
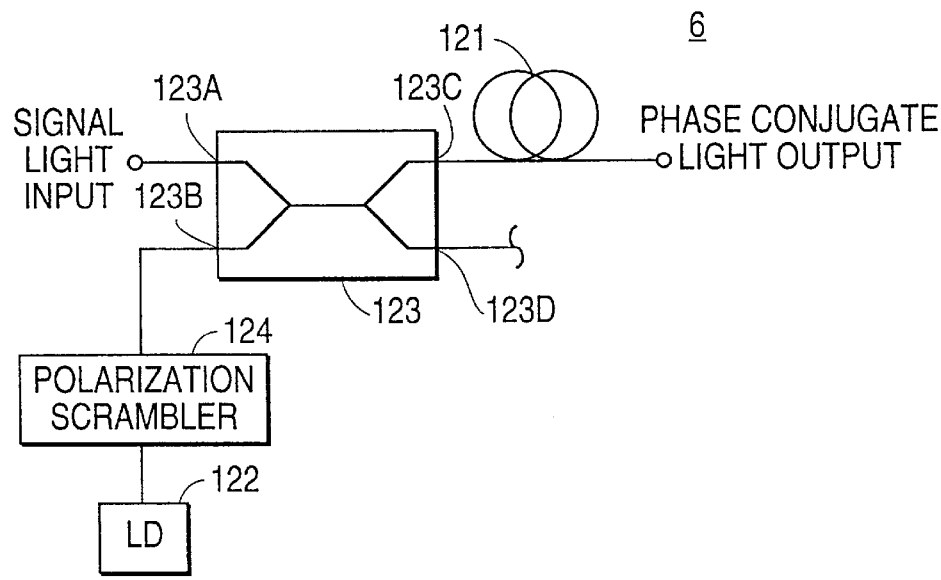
FIG. 3 is a diagram illustrating a phase conjugator, according to an additional embodiment of the present invention.

FIG. 3 is a diagram illustrating the phase conjugator 6, according to an additional embodiment of the present invention. In contrast with the phase conjugator illustrated in FIG. 2, the phase conjugator illustrated in FIG. 3 includes a polarization scrambler (polarized wave scrambler) 124 positioned between the laser diode 122 and the port 123B of the optical coupler 123.

Generally, in a single mode fiber, there exist two polarization modes where the planes of polarization are orthogonal to each other. As a result of the coupling of the two polarization modes and due to the influence of various external disturbances, the polarization state of the light beam supplied to the first end of the fiber fails to coincide with the polarization state of the light beam output from the second end of the fiber. Therefore, when a single mode fiber is used as a transmission line, the polarization state of the signal light beam supplied to the phase conjugator is varied with the lapse of time by, for example, environmental changes.

The efficiency of conversion from the signal light beam into the phase conjugate light beam in the phase conjugator is dependent on the relationship between the polarization state of the signal light beam and that of the pump light beam supplied to the phase conjugator.

According to an embodiment of the present invention as illustrated in FIG. 3, the pump light beam output from the laser diode 122 is joined to the signal light beam via the polarization scrambler 124, so that even if the polarization state of the supplied signal light beam is varied with the lapse of time, it is still possible to realize stable operation of various optical devices.

The polarized light scrambler 124 has a known construction, and includes a combination of a ½ wavelength plate (not illustrated), a ¼ wavelength plate (not illustrated) and a LiNbO$_3$ phase modulator (not illustrated). When the pump light beam output from the laser diode 122 is, for example, a substantially linear polarized light beam, the scrambler 124 functions to rotate the plane of polarization of the light beam.

In FIG. 3, the polarization scrambler 124 is connected to act on the pump light beam output from the laser diode 122. However, polarization scrambler 124 may be positioned between the port 123A of the optical coupler 123 and the first optical fiber SMF1 (see FIG. 1), or may be incorporated in a transmitter to act on the signal light beam.

The following is a mathematical analysis of propagation of a signal light beam, according to embodiments of the present invention. Propagation of the signal light beam $E(x,y,z,t)=F(x,y)\phi(z,t)\exp[i(\omega t-kz)]$ in optical fiber transmission can generally be described by the following nonlinear Schroedinger equation, where $F(x,y)$ denotes the transverse mode distribution, and $\phi(z,t)$ denotes the complex envelope of the light beam. It is assumed here that $\phi(z,t)$ is changed sufficiently slowly in comparison with the frequency $\omega$ of the light beam.

Equation (3):

$$i\frac{\partial \phi}{\partial z} - (1/2)\beta_2 \frac{\partial^2 \phi}{\partial T^2} + \gamma|\phi|^2\phi = -(i/2)\alpha\phi$$

In Equation (3): $T=t-\beta_1 z$ (where $\beta_1$ is propagation constant); $\alpha$ is the loss of the fiber; $\beta_2$ is the GVD of the fiber; and Equation (4):

$$\gamma = \frac{\omega n_2}{cA_{eff}}$$

denotes the coefficient of the optical Kerr effect in the fiber. In Equation (4), $n_2$ and $A_{eff}$ represent the nonlinear refractive index of the fiber and the effective core area thereof, respectively, and c represents the light velocity in a vacuum. In this example, the GVD is taken into consideration, and any higher-degree dispersion is omitted. Also, in this example, $\alpha$, $\beta_2$ and $\gamma$ are functions of z, and can be expressed as $\alpha(z)$, $\beta_2(z)$ and $\gamma(z)$, respectively. Further, the position of the phase conjugator is set at the origin (z=0).

Here, the following function for normalization is introduced.

$$\phi(z,T)=A(z)u(z,T) \qquad \text{Equation (5)}$$

In the above, $A(z)$ denotes the amplitude.

Equation (6):

$$A(z) \equiv A(0)\exp\left[-(1/2)\int_0^z \alpha(z)dz\right]$$

where one case of $\alpha(z)>0$ signifies that the transmission line has a loss, and the other case of $\alpha(z)<0$ signifies that the transmission line has a gain. Meanwhile, $A(z)\equiv(0)$ signifies that there is no loss. $A(z)_2=P(z)$ corresponds to the optical power.

Substituting Equations (5) and (6) for Equation (3), the following evolution equation is obtained.

Equation (7):

$$i\frac{\partial u}{\partial Z} = (1/2)\beta_2(z)\frac{\partial^2 u}{\partial T^2} - \gamma(z)A(z)^2|u|^2 u$$

Then, the following transformation is performed.

Equation (8):

$$\zeta = \int_0^z |\beta_2(z)|dz$$

As a result, Equation (7) is transformed as follows.

Equation (9):

$$i\frac{\partial u}{\partial \zeta} = \frac{\text{sgn}[\beta_2]}{2}\frac{\partial^2 u}{\partial T^2} - \frac{\gamma(\zeta)A(\zeta)^2}{|\beta_2(\zeta)|}|u|^2 u$$

In the above, $\text{sgn}[\beta_2]\equiv\pm 1$ takes a value +1 when $\beta_2>0$, signifying normal dispersion, or takes a value −1 when $\beta_2<0$, signifying anomalous dispersion. If Equation (9) is established, the complex conjugate thereof is also established, so that the following equation is obtained.

Equation (10):

$$-i\frac{\partial u^*}{\partial \zeta} = \frac{\text{sgn}[\beta_2]}{2}\frac{\partial^2 u^*}{\partial T^2} - \frac{\gamma(\zeta)A(\zeta)^2}{|\beta_2(\zeta)|}|u^*|^2 u^*$$

The complex conjugate light beam $u^*$ conforms to the same equation of evolution as the equation for u. However, the direction of propagation is reversed. This is exactly the operation of the phase conjugator. In the transmission type phase conjugator, the above is equivalent to inversion of the phase shift by group velocity of dispersion (GVD) and by SPM.

Figure 4:
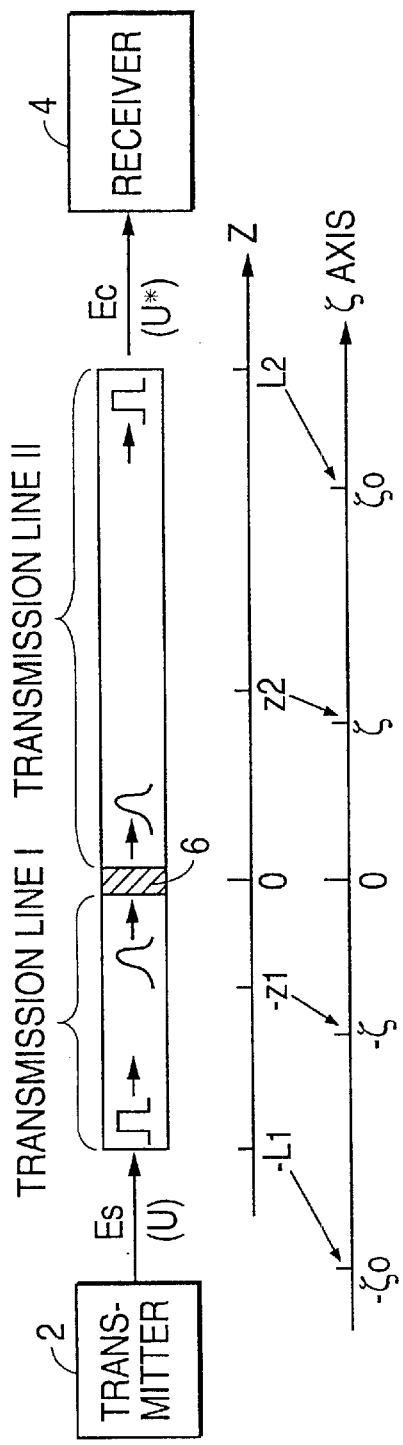
FIG. 4 is a diagram illustrating phase conjugation, according to an embodiment of the present invention.

FIG. 4 is a diagram illustrating phase conjugation, according to an embodiment of the present invention. Referring now to FIG. 4, a phase conjugator 6 is disposed between a transmission line I (length $L_1$) and a transmission line II (length $L_2$). Transmission lines I and II correspond, respectively, to the optical fibers SMF1 and SMF2 in FIG. 1. In normalized coordinates ($\zeta$ axis), the phase conjugator 6 is disposed at a middle point $\zeta=0$, and the receiver 4 is disposed at a point $\zeta=\zeta_o$. In the transmission line I ($-\zeta_o<\zeta<0$), u($\zeta$) conforms to Equation (9) of evolution. Then, u (0) is converted into the phase conjugate light beam u* (0) by the phase conjugator 6. u* ($\zeta$) propagates in the transmission line II ($0<\zeta<\zeta_o$) in conformity to evolution Equation (10).

At this time, if the parameter values are set so that the coefficients of the first and second terms on the right side of Equation (9) are equalized to each other within the normalized distance on arbitrary two points $-\zeta$ and $\zeta$ which are symmetrical with respect to the position ($\zeta=0$) of the phase conjugator 6 on the $\zeta$ axis, then u* at the point $-\zeta$ becomes a phase conjugate light beam corresponding to u at the point $\zeta$. That is, the following two equations are the required conditions.

$$\text{sgn}[\beta_2(-\zeta)]=\text{sgn}[\beta_2(\zeta)] \quad \text{Equation (11)}$$

Equation (12):

$$\frac{\gamma(-\zeta)A(-\zeta)^2}{|\beta_2(-\zeta)|} = \frac{\gamma(\zeta)A(\zeta)^2}{|\beta_2(\zeta)|}$$

Equation (11) represents the requisite that the signs of dispersion in the two transmission lines I and II should be equal to each other, and this requisite is coincident with the dispersion compensating condition. Considering that $\gamma>0$ and $A(z)^2>0$ in the fiber, the above condition can be rewritten as follows.

Equation (13):

$$\frac{\gamma(-\zeta)A(-\zeta)^2}{\beta_2(-\zeta)} = \frac{\gamma(\zeta)A(\zeta)^2}{\beta_2(\zeta)}$$

The sign of the phase shift by GVD and SPM at the point ($-\zeta$) in the transmission line I is inverted by the phase conjugator. Consequently, the waveform distortion derived from this phase shift is compensated by the distortion derived from the phase shift at the point ($\zeta$) in the transmission line II. Thus, whole compensation over the entire length can be attained by repeating, in each of the small sections, the partial compensation based on the above setting.

Next, the above compensating condition will be described below with the z-coordinates. From Equation (13), there is obtained the following Equation (14):

$$\frac{\gamma(-z_1)(A(-z_1))^2}{\beta_2(-z_1)} = \frac{\gamma(z_2)(A(z_2))^2}{\beta_2(z_2)}$$

Namely, the requisite condition is such that, in each of the sections, the ratio of the GVD to the product of the nonlinear constant and the optical power is the same. Here, $-z_1$ and $Z_2$ denote the two points that satisfy the following Equation (15).

Equation (15):

$$\int_0^{-z_1}|\beta_2(z)|dz = -\int_0^{z_2}|\beta_2(z)|dz$$

Equations (16) and (17) are obtained from Equations (14) and (15).

$$\beta_2(-z_1)dz_1=\beta_2(z_2)dz_2 \quad \text{Equation (16)}$$

$$\gamma(-z_1)A(-z_1)^2 dz_1=\gamma(z_2)A(z_2)^2 dz_2 \quad \text{Equation (17)}$$

In the above equations, $dz_1$ and $dz_2$ denote the lengths of the subsections at the points $-z_1$ and $z_2$ respectively, and each section length is in inverse proportion to the relevant intrasection dispersion or to the product of the nonlinear constant and the optical power.

Here, considering the relationship between the dispersion $\beta_2$ and the dispersion parameter D, i.e., $D=-(2\pi c/\lambda^2)\beta_2$, the following relationship can be obtained from Equations (16) and (17), where D is a function of z and is also expressed as D(z).

$$D(-z_1)dz_1=D(z_2)dz_2 \quad \text{Equation (18)}$$

$$\gamma(-z_1)P(-z_1)dz_1=\gamma(z_2)P(z_2)dz_2 \quad \text{Equation (19)}$$

It is seen that, regarding both the dispersion and the nonlinear effect, the compensating condition is that the increment at one of the two positions symmetrical with respect to the phase conjugator is equal to the decrement at the other position.

Equations (18) and (19) represent the requisites for compensation and signify that the total amount of the dispersion and the total amount of the optical Kerr effect in each subsection are equal to those in the corresponding subsection. Considering here that Equation (4) and $I=P/A_{eff}$ represent the light intensity, the above equations signify that the desired compensation can be achieved if the dispersion value and the product of the nonlinear refractive index and the light intensity in each subsection of the transmission lines I and II is set to be in inverse proportion to the length of the section, and also if the ratio thereof is set to be equalized.

Particularly, when D and $\gamma$ are fixed and the power variation is small, the following equations can be obtained by integrating Equations (18) and (19).

$$D_1L_1=D_2L_2 \quad \text{Equation (20)}$$

Equation (21):

$$\gamma_1\overline{P_1}L_1 = \gamma_2\overline{P_2}L_2$$

In the above, $\overline{P}_1$ and $\overline{P}_2$ denote the average powers in the transmission lines I and II, respectively. Also $D_1$ and $\gamma_1$ denoted the dispersion parameter and the nonlinear coefficient in the transmission line I, respectively; and $D_2$ and $\gamma_2$ denote the dispersion parameter and the nonlinear coefficient in the transmission line II, respectively. Equations (20) and (21) conform with the conditions in the method of GVD and SPM compensation based on the dispersion compensation and the average value approximation.

A method of providing a gain to compensate for the loss will be described below. A medium with a distributed gain should be used as a transmission line. For example, a Raman amplifier or a doped fiber amplifier which is rarely doped with $Er^{3+}$ ions may be used to provide such a transmission line.

According to embodiments of the present invention, the ratio of the optical Kerr effect to the dispersion value is controlled. Therefore, complete compensation can be realized by providing, at positions equivalently symmetrical with respect to the phase conjugator, the same ratio of the optical Kerr effect to the dispersion.

An increase of this ratio along the transmission line can be attained by gradually decreasing the dispersion or gradually increasing the optical Kerr effect. It is possible to change the dispersion value by adequately designing the fiber. For example, the above ratio is changeable by changing the zero dispersion wavelength of a dispersion shift fiber (DSF) or by changing the relative refractive index between the core and the clad of the fiber or the core diameter thereof. Meanwhile, change of the optical Kerr effect can be achieved by changing the nonlinear refractive index or the light intensity. Consequently, an optical fiber applicable to the present invention can be manufactured by continuously changing at least one fiber parameter selected from the loss, nonlinear refractive index, mode field diameter and dispersion.

Here, a description will be given with regard to a method of changing the light intensity. For instance, an increase of the light intensity along a transmission line having some loss can be attained by gradually decreasing the effective core sectional area $A_{eff}$ within a range where the loss is not varied so much. For example, if the mode field diameter (MFD) is reduced to a half, the light intensity is increased approximately four times. Although the MFD needs to be further reduced if the loss is greater, any excessive reduction of the MFD causes an increase of the loss. The minimum value of the MFD effective in practical use is at most 2 to 3 $\mu$m. Considering that the MFD of a 1.31 $\mu$m zero dispersion SMF is about 10 $\mu$m and the MFD of a 1.55 $\mu$m DSF is about 8 $\mu$m, it follows that the loss compensable merely by the MFD alone is about 10 dB in the SMF or about 8 dB in the DSF. Even when any further greater loss is existent, the embodiments of the present invention may be carried out by combining the effect of reducing the core diameter with the effect of decreasing the dispersion value. For example, even in case a further loss of 3 dB is existent, a distribution adapted for satisfying the condition of Equation (14) is realizable if the dispersion value can be halved.

Figure 5:
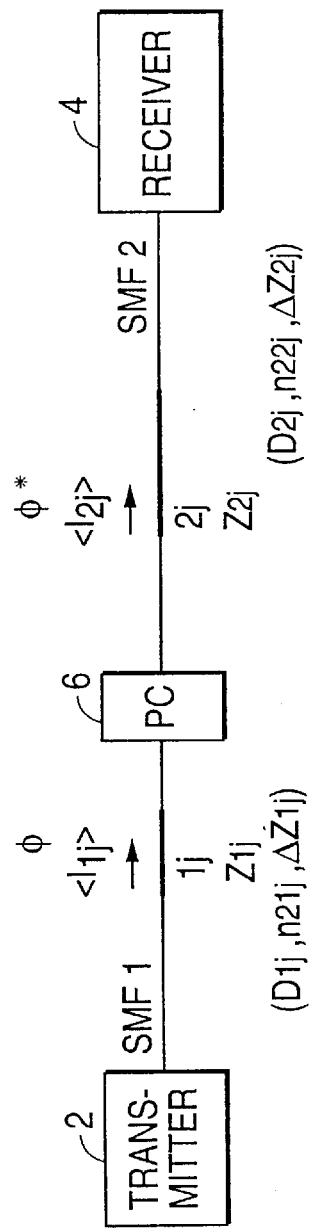
FIG. 5 is a diagram illustrating an optical communication system, according to an embodiment of the present invention.

FIG. 5 is a diagram illustrating an optical communication system, according to an embodiment of the present invention. Here, parameters of subsections $1j$ (length $\Delta z_{1j}$) and $2j$ (length $\Delta z_{2j}$) at positions $z1j$ and $z2j$ (defined by Equation (15)) in transmission lines symmetrical with respect to a phase conjugator 6 are so set as represented by the following equations.

$$D_{1j}\Delta z_{1j} = D_{2j}\Delta z_{2j} \qquad \text{Equation (22)}$$

Equation (23):

$$\frac{\omega_1 n_{21j}\langle I_{1j}\rangle}{D_{1j}} = \frac{\omega_2 n_{22j}\langle I_{2j}\rangle}{D_{2j}}$$

In the above, $D_{1j}$, $\omega_1$, $n_{21j}$ and $\langle I_{1j}\rangle$ denote the dispersion parameter, the optical frequency, the nonlinear refractive index and the average intensity, respectively, in the section $1j$; and $D_{2j}$, $\omega_2$, $n_{22j}$ and $\langle I_{2j}\rangle$ denote the dispersion parameter, the optical frequency, the nonlinear refractive index and the average intensity, respectively, in the section $2j$.

Hereinafter a concrete example will be explained. Suppose now that the dispersion of the optical fiber SMF1 is fixed as $D_1=-30$ ps/nm/km and the dispersion of the optical fiber SMF2 is fixed as $D_2=-0.3$ ps/nm/km. Then, from Equation (20), $L_1/L_2=D_2/D_1=1/100$. Therefore, when the entire length $L_2$ of the optical fiber SMF2 is, for example, 50 km, it follows that $L_1=500$ m. This signifies that, if the waveform is previously distorted by the fiber of 500 m, distortionless transmission is rendered possible over a distance of 50 km. A plurality of fibers having mutually different fiber parameters may be disposed in series in such a manner as to satisfy the conditions of Equations (22) and (23), and the fibers may be spliced to each other.

Figure 6:
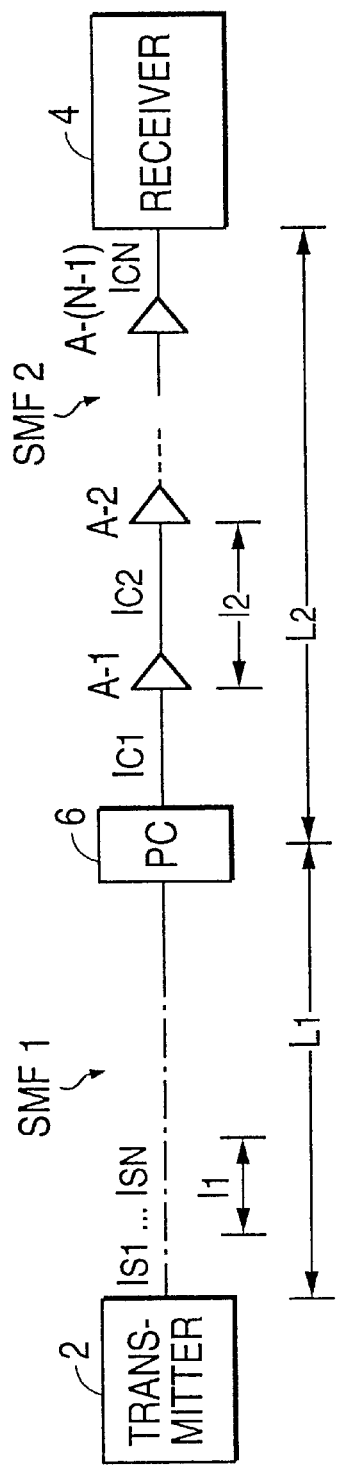
FIG. 6 is a diagram illustrating an optical communication system according to an additional embodiment of the present invention.

FIG. 6 is a diagram illustrating an optical communication system according to an additional embodiment of the present invention. More specifically, the optical communication system illustrated in FIG. 6 is a multi-repeating transmission system employing optical amplifiers.

Referring now to FIG. 6, (N−1) optical amplifiers A-1, . . . , A-(N−1) are disposed in a transmission line (optical fiber SMF2) at intervals of $l_2$ to perform optical amplifying repeating transmission. Thus, $L_2=Nl_2$. In this example, as illustrated in FIG. 6, another optical fiber SMF1 is virtually divided into the same number N of sections as that of the repeaters, wherein each section has a length of $l_1$. Thus, $L_1=Nl_1$. Since the ratio of $L_1$ to $L_2$ (and the ratio of $l_1$ to $l_2$) is in reciprocal proportional to the dispersion of each fiber, the length $L_1$ is set as $L_1=(D_2/D_1)L_2$, or $l_1=(D_2/D_1)l_2$. As for the optical Kerr effect, it is so set as to satisfy Equation (23) in corresponding subsections of optical fibers SMF1 and SMF2 with respect to the phase conjugator 6.

For example, assume that, for the dispersion values mentioned, optical transmission occurs over a repeating section of 50 km, with the optical fiber SMF1 divided at intervals of 500 m. Therefore, if the optical fiber SMF1 employed has a total length of 20 km and is divided by 40 at an interval of 500 m, then it becomes possible to perform transmission over a total length of 2000 km with 39 repeaters each covering 50 km posterior to the phase conjugator 6. In this case, the length of each section in the optical fiber SMF2 corresponding to each section of a length of 500 m in the optical fiber SMF1 is different therefrom. The corresponding section is defined in Equation (15), and a section of relatively large dispersion in the optical fiber SMF1 covers the longer section in the optical fiber SMF2.

Although the division in this example is at equal intervals, the intervals need not be equalized since the requisite is that the conditions of Equations (22) and (23) are satisfied with regard to the corresponding sections. Particularly, relative to the optical fiber SMF1, no optical amplifier is provided to compensate for the loss, so that some difficulties may be existent for the practical dispersion or power to satisfy the conditions. In such a case, the requisite regarding the dispersion or power can be alleviated by increasing the length L1, instead of equal-interval division thereof, in accordance with a reduction of the intensity caused by the loss.

Also, relative to the optical fiber SMF2, the loss effect can be diminished equivalently by dividing each repeating section without fixing the dispersion in such a manner as to relatively increase the dispersion in a high-power portion while relatively decreasing the dispersion in a low-power portion. This method renders it possible to alleviate the requirements for the dispersion or power in the optical fiber SMF1. The above method is enhanced as the division becomes finer. However, practically, the effect is sufficient if each section is divided into several portions. The number of required divisions is determined by the transmission speed and the transmission distance.

In the embodiment of the present invention illustrated in FIG. 6, the optical fiber SMF2 is used for amplifier repeating transmission. However, it may be so modified that the optical fiber SMF1 is used for amplifier repeating transmission and, thereafter, compensation is made in the optical fiber SMF2 by the same method. Such an example is illustrated in FIG. 7.

Figure 7:
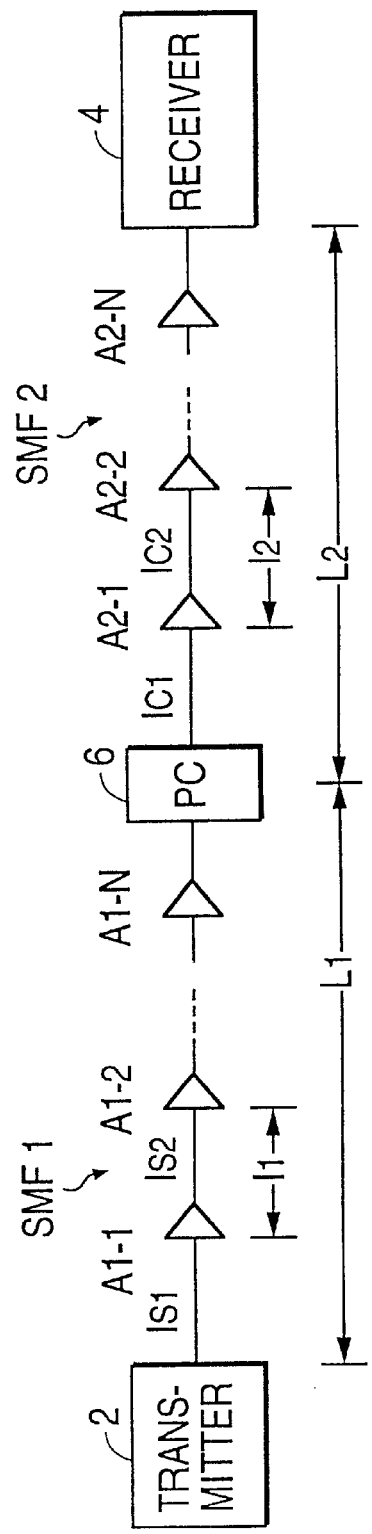
FIG. 7 is a diagram illustrating an optical communication system according to a further embodiment of the present invention.

More specifically, FIG. 7 is a diagram illustrating an optical communication system according to a further embodiment of the present invention. In the embodiment of the present illustrated in FIG. 7, the number of repeaters anterior and posterior to the phase conjugator 6 are mutually equalized, and the conditions are so set that Equations (22) and (23) are satisfied in the sections symmetrical with respect to the phase conjugator 6.

More specifically, a plurality (N) of optical amplifiers A1-1, . . . , A1-N are disposed at intermediate positions in a first optical fiber SMF1. Similarly, a plurality (N) of optical amplifiers A2-1, . . . , A2-N are disposed at intermediate positions in a second optical fiber SMF2. Since $L_1$ can be prolonged in this embodiment, $L_2$ is also rendered longer in accordance therewith, to thereby enable long-distance transmission. In this case, as discussed above, the loss effect can be equivalently diminished by dividing each repeating section without fixing the dispersion in the optical fiber SMF2 in such a manner as to relatively increase the dispersion in a high-power portion while relatively decreasing the dispersion in a low-power portion.

Figure 8:
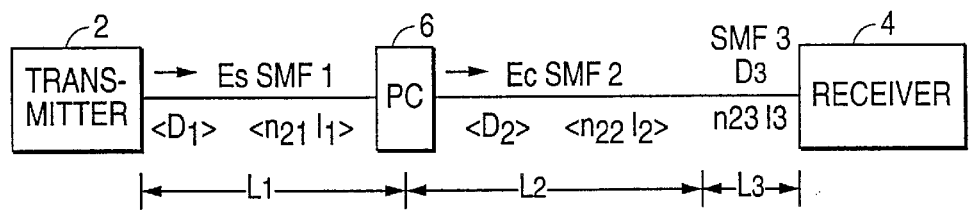
FIG. 8 is a diagram illustrating an optical communication system according to a still further embodiment of the present invention.

FIG. 8 is a diagram illustrating an optical communication system according to a still further embodiment of the present invention. More specifically, FIG. 8 relates to transmission employing average intensity approximation, where both the dispersion and the optical Kerr effect are not fixed in the transmission line.

First, regarding the average value of the dispersion, the conditions are so set that the following Equation (24) can be satisfied.

$$(D_1)L_1=(D_2)L_2 \quad \text{Equation (24)}$$

Regarding the average value of the product of the non-linear refractive index and the light intensity, the conditions are so set that the following Equation (25) is set, thereby allowing rough compensation.

$$(n_{21}I_1)L_1=(n_{22}I_2)L_2 \quad \text{Equation (25)}$$

As for the residual of the compensation, as illustrated in FIG. 8, the dispersion D3 of a third optical fiber SMF3 having a length L3 and disposed between the optical fiber SMF2 and the receiver 4, and the optical Kerr effect $n_{23}I_3$ in such fiber SMF3, are adequately adjusted to thereby realize substantially complete compensation.

Figure 9:
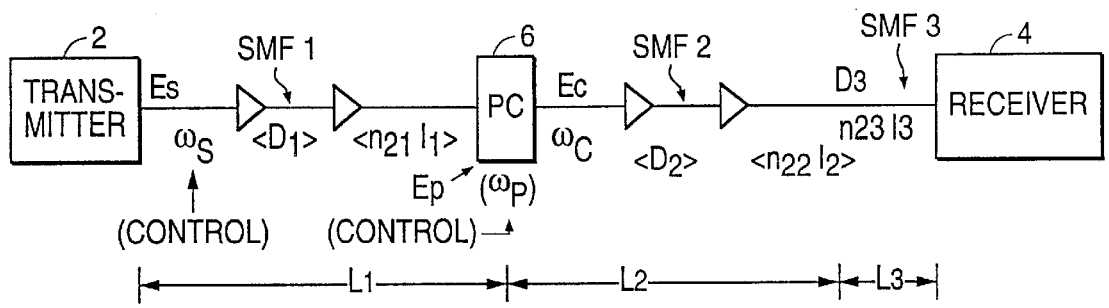
FIG. 9 is a diagram illustrating an optical communication system according to an embodiment of the present invention.

FIG. 9 is a diagram illustrating an optical communication system according to an embodiment of the present invention. More specifically, FIG. 9 represents the embodiment of the present invention illustrated in FIG. 8, as applied to an amplifying multi-repeating transmission system. In this case, a plurality of repeaters are provided at positions anterior and posterior to a phase conjugator 6, and the conditions may be so set as to satisfy Equations (22) and (23) in the sections mutually corresponding with respect to the phase conjugator 6.

Satisfactory compensation is achievable to a certain extent by setting the conditions in such a manner that Equations (24) and (25) are satisfied with regard to the average value in the entire length, as disclosed in Japanese Patent Application No. Hei 5-221856, which is incorporated herein by reference. For attaining further enhanced compensation, as illustrated in FIG. 8, a third optical fiber SMF3 may be provided. The dispersion $D_3$ and optical Kerr effect $n_{23}I_3$ of the third optical fiber SMF3 may be adequately adjusted.

In a practical long-distance transmission system, the ambient environment causes fluctuations to occur in the dispersion values. Particularly, dispersion fluctuations derived from temperature variations are relatively large, and such harmful influence is especially noticeable in a system where the dispersion is set to be approximately zero dispersion. A dispersion value approximate to zero dispersion can be changed in accordance with a slope of dispersion (approx. 0.08 ps/nm²/km) by changing the wavelength of the signal light. Further, in a system for generating phase conjugate light by four-wave mixing, a frequency $\omega_c$ of the phase conjugate light, a frequency $\omega_p$ of pump light and an angular frequency $\omega_s$ of signal light are in a relationship of $\omega_c=2\omega_p-\omega_s$, so that $\omega_c$ is changeable by changing $\omega_s$ or $\omega_p$. Thus, it becomes possible to perform optimal transmission in compliance with any variations of the dispersion by adjusting $\omega_s$ in the transmitter or by adjusting $\omega_p$ in the phase conjugator 6 in response to a control signal obtained from a terminal station (not illustrated).

Figure 10:
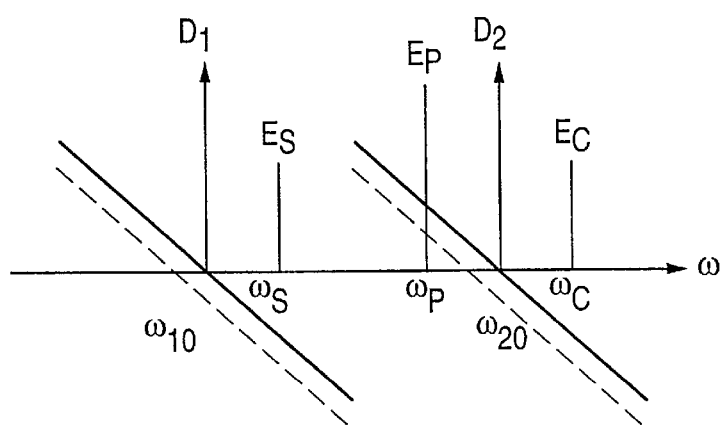
FIG. 10 is a diagram illustrating an optical frequency arrangement to zero dispersion wavelengths in two fibers, according to an embodiment of the present invention.

FIG. 10 is a diagram illustrating an optical frequency arrangement of zero dispersion wavelengths in two fibers, according to an embodiment of the present invention. More specifically, FIG. 10 shows a frequency arrangement of signal light, pump light and phase conjugate light to the respective zero dispersion wavelengths $\omega_{10}$ and $\omega_{20}$ of optical fibers SMF1 and SMF2, respectively. If the dispersion curves of the two fibers are shifted in the same direction by some change of the environment (as indicated by dashed lines in FIG. 10), $\omega_s$ and $\omega_c$ may be shifted in the same direction. However, since $\omega_c$ is shifted in the reverse direction to any change of $\omega_s$, it is desired that, simultaneously with a change of $\omega_s$, $\omega_p$ is also changed in the same direction and by the same value as $\omega_s$. In the case of FIG. 10, which is the simplest of all, $\omega_s$ and $\omega_p$ may be shifted in the same direction and by the same value ($\Delta\omega$) (that is, $\omega c+\Delta\omega=2(\omega_p+\Delta\omega)-(\omega_s+\Delta\omega)$). Since the dispersion variations are actually not so simple, proper correction should be performed in conformity with each situation. Practically, an optimal state is attained by fine adjustments of $\omega_s$ and $\omega_p$ while monitoring, for example, a received waveform in the terminal station.

FIG. 11 is a diagram illustrating an optical communication system according to an embodiment of the invention. In this embodiment, the average intensity is fundamentally adopted and the dispersion control shown in FIG. 7 is executed to alleviate the harmful influence of the power change (deterioration) between optical amplifiers. More specifically, each repeating section is divided into several portions, and the dispersion value is gradually decreased in the forward direction of transmission. An example thereof is illustrated in FIG. 12.

More specifically, FIG. 12 is a diagram illustrating dispersion control in an average intensity method, according to an embodiment of the present invention. Relative to a case where the average dispersion values in a transmission line are set to $D_1=-30$ ps/nm/km and $D_2=-0.30$ ps/nm/km, FIG. 12 represents an example where each repeating section is divided into three portions, and the dispersion values therein are so set as to become −0.35, 0.30 and −0.25 ps/nm/km, respectively, in the forward direction of transmission. When the repeating section has a length of 51 km in the above example, then it is divided at an interval of 17 km per portion, so that the dispersion inclination becomes approximately −0.04 dB/km. Therefore, if the fiber loss is −0.20 dB/km, it is possible to reduce the change of the ratio, which is expressed by Equation (23), to −0.16 dB/km or so. Consequently, there is realizable a state equivalent to the one with less loss, whereby it is rendered possible to extend the repeating section of the optical amplifier. In addition, the effect of compensation for the waveform distortion can be enhanced even if the repeating interval remains the same.

FIG. 13 is a diagram illustrating an optical communication system according to an embodiment of the invention. The embodiment of the present invention as illustrated in FIG. 13 represents an amplifying multi-repeating transmission system, where the ratio of the nonlinear effect to the dispersion is maintained constant in an optical fiber SMF1. In this example, the optical fiber SMF1 is divided into a plurality of sections, and the sum of the dispersion value $D_{sj}\Delta Z_{sj}$ in each section j is equalized to the total GVD of the optical fiber SMF2, and further the value ($n_{21}I_{sj}/D_{sj}$) of the ratio of the nonlinear effect to the dispersion in each section j is set to be constant. Also, in the optical fiber SMF2, amplifying multi-repeating transmission is performed by employing average value approximation, wherein the total of the nonlinear effect in the optical fiber SMF1 is equalized to the total of the average value of the nonlinear effect in the optical fiber SMF2. Also, with regard to the optical fiber SMF2, the same setting may be executed as for the optical fiber SMF1. Since the reduction of $I_{sj}$ resulting from the loss can be compensated by gradually decreasing $D_{1j}$, it is possible to keep constant the ratio of the nonlinear effect to the dispersion. Moreover, the dispersion value in each section can be kept constant by increasing the length $\Delta Z_{1j}$ of each section in inverse proportion to the loss. That is, the compensation maintains both of $n_{21}I_{sj}\Delta Z_{1j}$ and $D_{1j}\Delta Z_{1j}$ to be constant.

In this embodiment, the number of divisions of the optical fiber SMF1 is equal to the number of repeaters in the optical fiber SMF2. However, in such average value approximation, similar effect is practically obtainable if the number of divisions of the optical fiber SMF1 is set to be less than the number of repeaters in the optical fiber SMF2. Namely, the average value per some divisions in the same number of divisions is used for substitution. The effect attained in this case is dependent on the transmission speed and the transmission distance.

Figure 14:
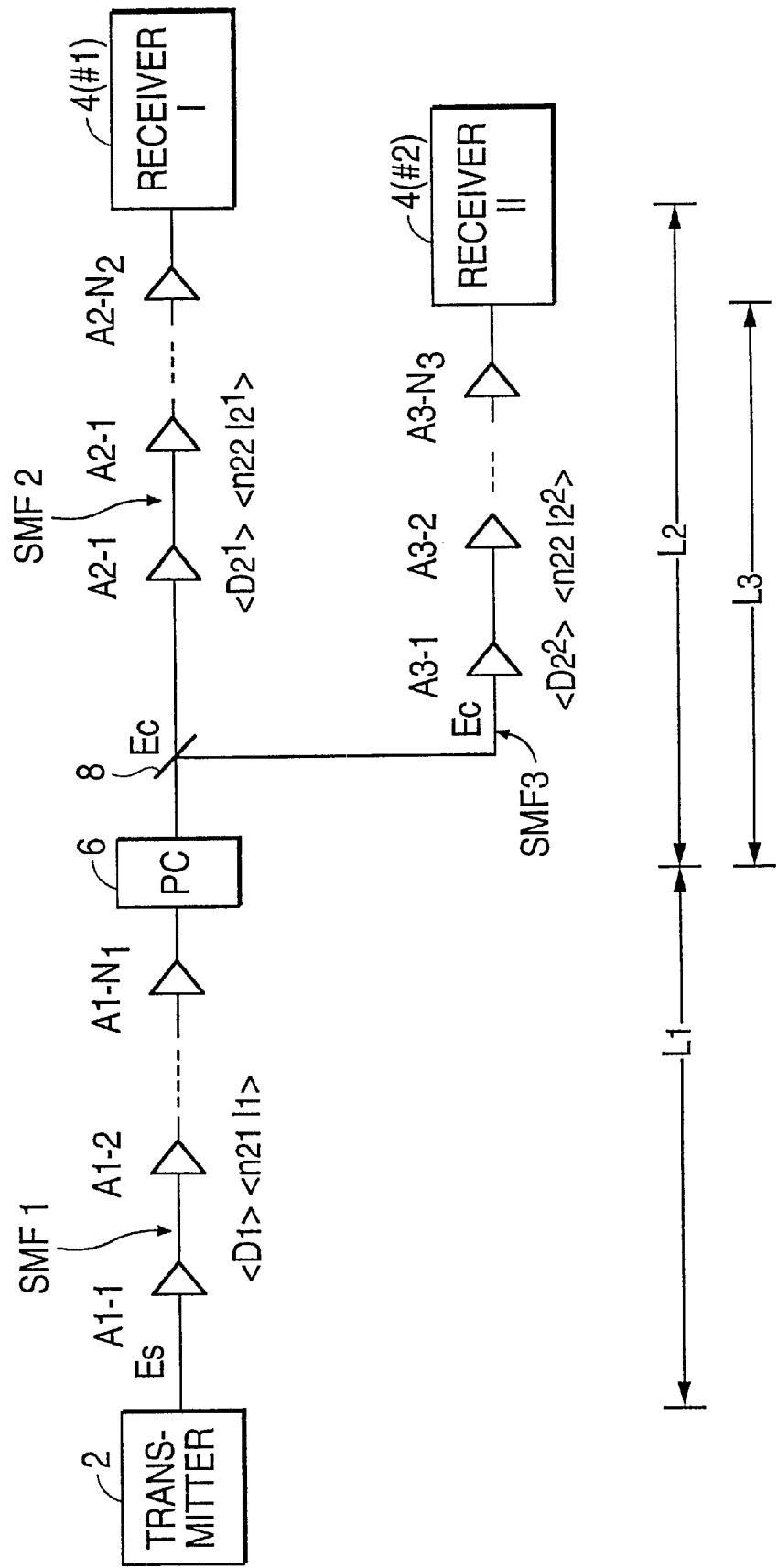
FIG. 14 is a diagram illustrating an optical communication system according to an additional embodiment of the invention.

FIG. 14 is a diagram illustrating an optical communication system according to an additional embodiment of the invention. In the embodiment of the present invention illustrated in FIG. 14, a light beam output from the phase conjugator 6 is branched into two separate light beams by an optical coupler 8 or an optical switch (not illustrated). One branched light beam is transmitted via an optical fiber SMF2 (length $L_2$) to a receiver 4 (#1) while the other branched light beam is transmitted via an optical fiber SMF3 (length $L_3$) to another receiver 4 (#2). The optical fiber SMF2 is equipped with optical amplifiers A2-1, 2, . . . , $N_2$. The optical fiber SMF3 is equipped with light amplifiers A3-1, 2, . . . , $N_3$. It is possible to realize desired transmission by branching the output light beam from the phase conjugator 6 and utilizing dispersions and light intensities which conform to the distances to the receivers 4 (#1, #2).

Figure 15:
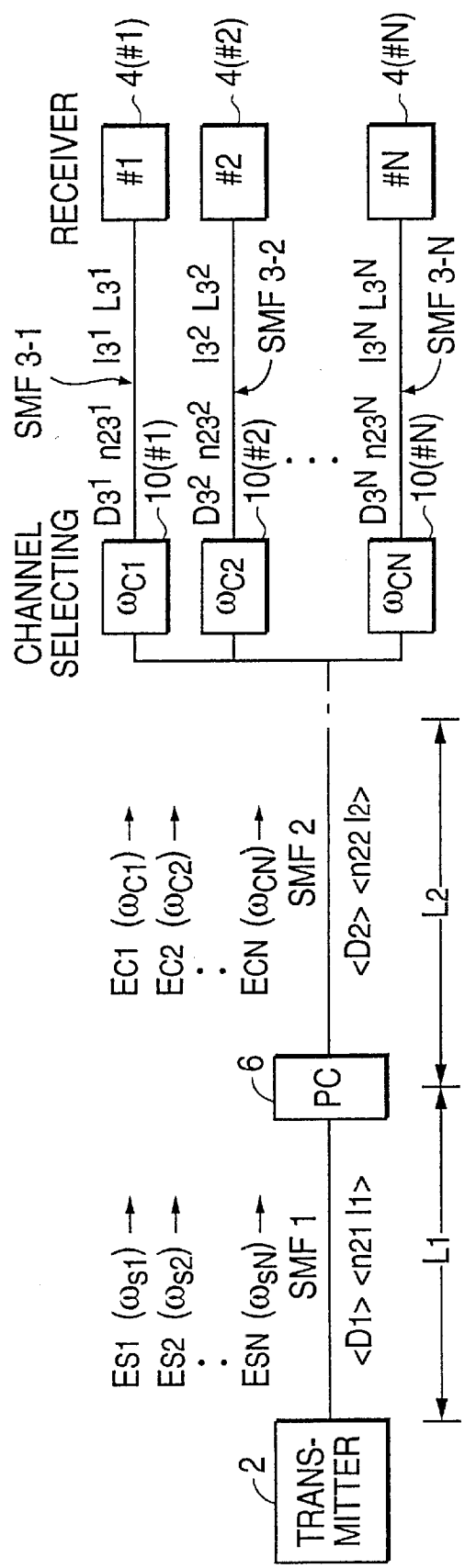
FIG. 15 is a diagram illustrating an optical communication system according to a further embodiment of the invention.
Figure 16:
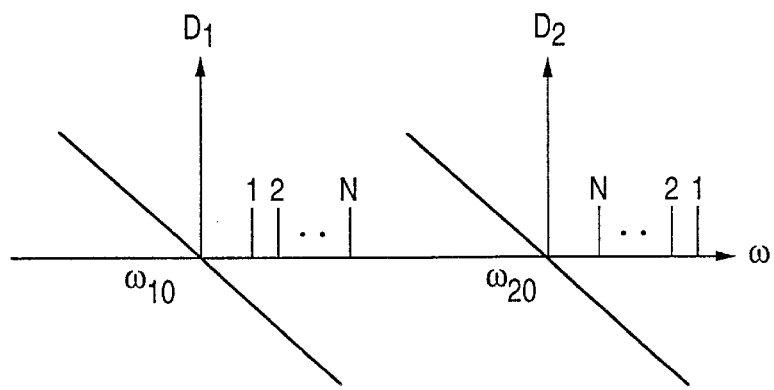
FIG. 16 is a diagram illustrating a frequency arrangement in the optical communication system illustrated in FIG. 15, according to an embodiment of the present invention.

FIG. 15 is a diagram illustrating an optical communication system according to a further embodiment of the invention. Referring now to FIG. 15, a plurality of third fibers SMF3-1 to SMF3-N are used to perform additional compensation in wavelength division multiplex transmission. Optical filters 10 (#1, #2, . . . , #N) are for selection of channels with regard to the phase conjugate light beam transmitted via the optical fiber SMF2. The light beams output from the optical filters 10 (#1, #2, . . . , #N) are transmitted via compensating optical fibers SMF3-1, 2, . . . , N to receivers 4 (#1, #2, . . . , #N), respectively. WDM signal light beams $E_{s1}$, $ES_{s2}$, . . . , $\omega_{sN}$ (frequencies: $\omega_{s1}$, $\omega_{s2}$ . . . , $\omega_{sN}$) of N channels transmitted via the optical fiber SMF1 are converted by the phase conjugator 6 into WDM phase conjugate light beams $E_{c1}$, $E_{c2}$, . . . , $E_{cN}$ (frequencies: $\omega_{c1}$, $\omega_{c2}$, . . . $\omega_{cN}$) of N channels. The WDM phase conjugate light beams $E_{c1}$, $E_{c2}$, . . . , $E_{cN}$ are transmitted via the optical fiber SMF2 to be received by the corresponding receivers 4 (#1 . . . #N). FIG. 16 is a diagram illustrating a frequency arrangement in the optical communication system illustrated in FIG. 15, according to an embodiment of the present invention. More specifically, the channels in the optical fibers SMF1 and SMF2 in FIG. 15 are dispersed as illustrated in FIG. 16.

With dispersion compensation using a phase conjugator, the signs of dispersion anterior and posterior to the phase conjugator should be identical to each other, so that the frequency arrangement with respect to zero dispersion becomes as shown in FIG. 16. In such a case, there is a transformation from normal dispersion to normal dispersion. More specifically, the absolute value of the dispersion to the first channel is minimum in the optical fiber SMF1, whereas in the optical fiber SMF2, the absolute value of the dispersion to the Nth channel is minimum. In principle, therefore, it is difficult to achieve complete dispersion compensation simultaneously for the entire channels.

In FIG. 15, frequency selection is executed with regard to each channel after the output of the optical fiber SMF2 is branched, and then additional compensation is performed by the use of the third fibers SMF3-1, 2, . . . , N which conform to the residual compensation amounts for the individual channels.

Figure 17:
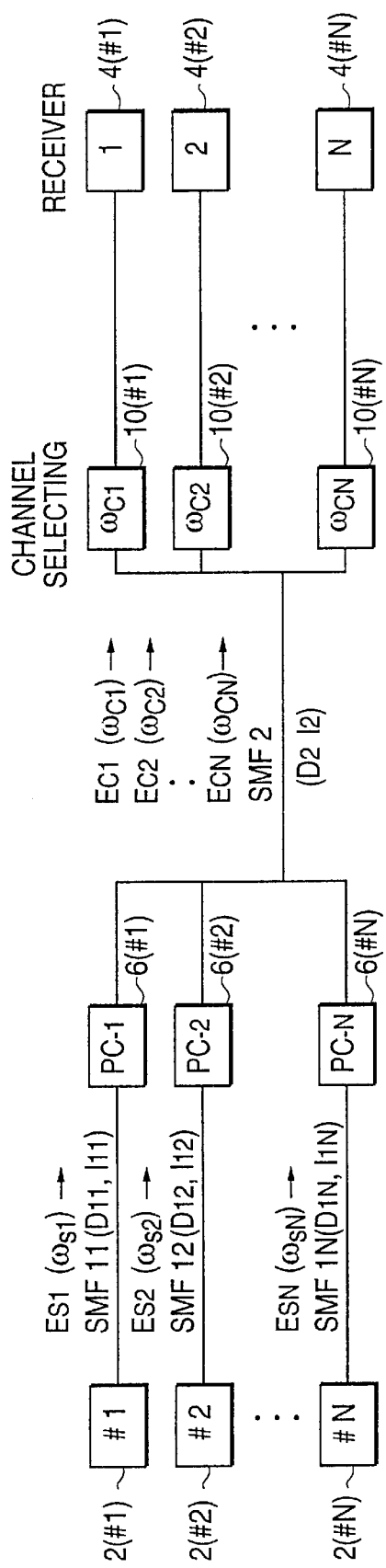
FIG. 17 is a diagram illustrating an optical communication system according to an embodiment of the present invention.

FIG. 17 is a diagram illustrating an optical communication system according to an embodiment of the present invention, and which executes ideal compensation equally for all the channels. In this embodiment, signal light beams of respective channels are transmitted via individual fibers SMF11, 12, . . . , 1N with the intensities ($I_{11}$, $I_{12}$, . . . , $I_{1N}$) conforming to different dispersions. The output light beams of the optical fibers are converted into phase conjugate light beams by phase conjugators 6 (#1), (#2), . . . , (#N) of individual channels or by a single phase conjugator (not illustrated) collectively for all the channels. The lights output from the phase conjugators 6 (#1), (#2), . . . , (#N) are transmitted via a common optical fiber SMF2 to be received in the same manner as in the embodiment of the present invention illustrated in FIG. 15. An optical multiplexer (not illustrated) is used to combine a plurality of signal light beams or phase conjugate light beams. A third optical fiber SMF3 is not necessary in FIG. 17. The dispersion and the nonlinear effect in each channel may be set by any of the methods mentioned above.

Since a phase conjugator has polarization dependency, its transformation efficiency is different in accordance with the polarization state of signal light, whereby the overall system characteristic is rendered unstable. Furthermore, optical component elements used in the phase conjugator or the optical amplifier also have polarization dependency in most cases, so that the signal level is rendered unstable when multiple stages thereof are connected. Such instability can be suppressed by applying polarization diversity or polarization active control, or by performing polarization scrambling for the signal light beam or the pump light beam. Particularly, polarization scrambling for a signal light beam in a transmitter is advantageous since such a method requires a relatively simple hardware configuration and eliminates harmful influence from various kinds of polarization dependency which occur in long-distance transmission.

Figure 18:
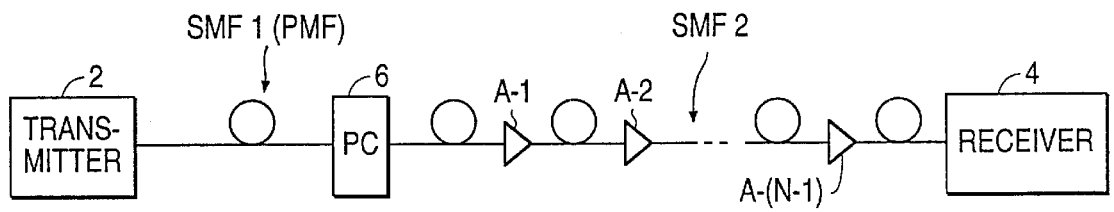
FIG. 18 is a diagram illustrating an optical communication system according to an addition embodiment of the present invention.

FIG. 18 is a diagram illustrating an optical communication system according to an additional embodiment of the present invention. In comparison with the embodiment of the present invention illustrated in FIG. 6, the optical communication system illustrated in FIG. 18 uses a polarization maintaining fiber (PMF) as a first optical fiber SMF1.

Referring now to FIG. 18, a transmitter 2 outputs a signal light beam composed substantially of linear polarized waves. Generally, a polarization maintaining fiber has at least one main axis and is capable of transmitting a linear polarized light beam, which has a plane of polarization parallel to the main axis, while maintaining such plane of polarization. The signal light beam output from the transmitter 2 is provided to the first optical fiber SMF1 so that the plane of polarization thereof becomes parallel to the main axis of the first optical fiber SMF1. The first optical fiber SMF1 and a phase conjugator 6 are connected so that the plane of polarization of the signal light beam output from the first optical fiber SMF1 coincides with the plane of polarization of a pump light beam in the phase conjugator 6. The condition for compensating for the waveform distortion derived from GVD and the optical Kerr effect is the same as that in the embodiment of the present invention illustrated in FIG. 6, so that a repeated explanation thereof is omitted here.

The efficiency of generating a phase conjugate light beam, which is produced by four-wave mixing (FWM) and optical parametric amplification, depends on the polarization of an input signal light beam and a pump light beam. Where the signal light beam input to the phase conjugator 6 is in a fixed state of polarization, it is possible to stably generate a phase conjugate light beam at a high efficiency in the phase conjugator 6.

Preferably, the transmitter 2, the first optical fiber SMF1 and the phase conjugator 6 are disposed in a transmitting station, while a second optical fiber SMF2 is used as a transmission line, and a receiver 4 is disposed in a receiving station.

As with the embodiment of the present invention illustrated in FIG. 18, each of the other embodiments of the present invention described above can use a polarization maintaining fiber as the first optical fiber SMF1. The polarization maintaining fiber should have at least one main axis and be capable of transmitting a linear polarized light beam which has a plane of polarization parallel to the main axis. The polarization maintaining fiber should be able to maintain the plane of polarization of the linear polarized light beam. Also, in each of the other embodiments of the present invention described above, signal light beams output from a transmitter should be provided to the first optical fiber SMF1 so that the plane of polarization thereof becomes parallel to the main axis of the first optical fiber SMF1. The first optical fiber SMF1 and a phase conjugator should be connected so that the plane of polarization of the signal light beam output from the first optical fiber SMF1 coincides with the plane of polarization of a pump light beam in the phase conjugator.

For example, in FIGS. 1, 5, 6, 7, 8, 9, 11, 13, 14 and 15, the first optical fiber SMF1 can be a polarization maintaining fiber. Similarly, in FIG. 17, each first optical fiber SMF11 through SMF1N can be a polarization maintaining fiber.

Therefore, according to the above embodiments of the present invention, an apparatus includes a first fiber, a phase conjugator, and a second fiber. The first fiber transmits the light signal therethrough, and is a polarization maintaining fiber. The light signal is a linear polarized wave. The phase conjugator receives the light signal from the first fiber and produces a corresponding phase conjugate light signal. The second fiber receives the phase conjugate light signal from the phase conjugator and transmits the phase conjugate light signal therethrough.

In addition, in various of the above embodiments of the present invention, (a) the amount of dispersion of the first fiber is set to be equal to the amount of dispersion of the second fiber, and (b) the amount of optical Kerr effect of the first fiber is set to be equal to the amount of optical Kerr effect of the second fiber.

In other embodiments of the present invention, (a) the ratio of the dispersion of the first fiber to the dispersion of the second fiber is set to be substantially equal to the ratio of the length of the second fiber to the length of the first fiber, and (b) the ratio of the product of the optical frequency, the light intensity and the nonlinear refractive index of the first fiber to the product of the optical frequency, the light intensity and the nonlinear refractive index of the second fiber is set to be substantially equal to the ratio of the length of the second fiber to the length of the first fiber.

In addition, in various of the above embodiments of the present invention, the first fiber is divided into a plurality of sections which each have an associated dispersion and optical Kerr effect, and the second fiber is divided into a plurality of sections which each have an associated dispersion and optical Kerr effect and which correspond, respectively, to the plurality of sections of the first fiber. The amount of dispersion in each section of the plurality of sections of the first fiber is set to be equal to the amount of dispersion of the corresponding section of the plurality of sections of the second fiber. Moreover, the amount of optical Kerr effect in each section of the plurality of sections of the first fiber is set to be equal to the amount of optical Kerr effect of the corresponding section of the plurality of sections of the second fiber.

Further, in various of the above embodiments of the present invention, the first fiber is divided into a plurality of sections which each have an associated dispersion, length, light intensity, and nonlinear refractive index, and the second fiber is divided into a plurality of sections which each have an associated dispersion, length, light intensity, and nonlinear refractive index, and which correspond, respectively, to the plurality of sections of the first fiber. The ratio of the dispersion in each section of the plurality of sections of the first fiber to the dispersion of the corresponding section of the plurality of sections of the second fiber is set to be substantially equal to the ratio of the length of the respective section of the plurality of sections of the second fiber to the length of the respective section of the plurality of sections of the first fiber. In addition, the ratio of the product of the optical frequency, he light intensity and the nonlinear refractive index of each section of the plurality of sections of the first fiber to the product of the optical frequency, the light intensity and the nonlinear refractive index of the corresponding section of the plurality of sections of the second fiber is set to be substantially equal to the ratio of the length of the respective section of the plurality of sections of the second fiber to the length of the respective section of the plurality of sections of the first fiber.

Figure 19:
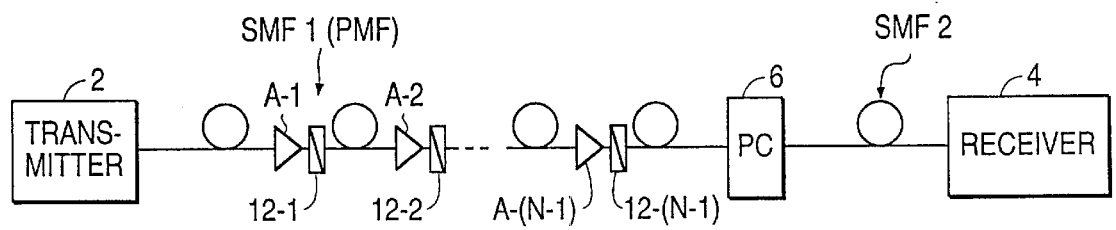
FIG. 19 is a diagram illustrating an optical communication system according to an embodiment of the present invention.

FIG. 19 is a diagram illustrating an optical communication system according to an embodiment of the present invention. Referring now to FIG. 19, a plurality (N−1) of optical amplifiers A-1, . . . , A-(N−1) are disposed at intermediate positions in a first optical fiber SMF1, and a phase conjugator 6 and a receiver 4 are connected to each other via a second optical fiber SMF2. The first optical fiber SMF1 is a polarization maintaining fiber. To simply this example, it is assumed here that the main axes of all fiber sections are directionally coincident with one another. Polarizers 12-1, . . . , 12-(N−1) are provided on the signal light output side of the optical amplifiers A-1, . . . , A-(N−1), respectively. The main axis of polarization of each polarizer is set to be substantially parallel to the plane of polarization of the signal light beam output from each optical amplifier. More specifically, each polarizer is disposed so that the main axis of polarization thereof becomes substantially parallel to the main axis of each fiber section.

Preferably, the transmitter 2 is disposed in a transmitting station, while the first optical fiber SMF1 is used as a transmission line, and the phase conjugator 6, the second optical fiber SMF2 and the receiver 4 are disposed in a receiving station.

When the first optical fiber SMF1 is a polarization maintaining fiber, its length usually becomes more than 10 km. Therefore, if a signal light beam composed substantially of linear polarized waves is supplied to the input end of the first optical fiber SMF1, there may exist a possibility that the linear polarization of the signal light beam is distorted at the output end of the first optical fiber SMF1. Thus, the embodiment of the present invention as illustrated in FIG. 19 improves the polarized state of the signal light beam at the signal light output side of each optical amplifier. Therefore, polarizers 12-1, . . . , 12-(N−1) may be provided on the signal light input side of the light amplifiers A-1, . . . , A-(N−1), respectively. The polarizers need not be added exactly to the entire light amplifiers.

In the embodiment of the present invention as illustrated in FIG. 18, it is possible to maintain an optimal state of reception despite any variation of the polarized waves.

Figure 20:
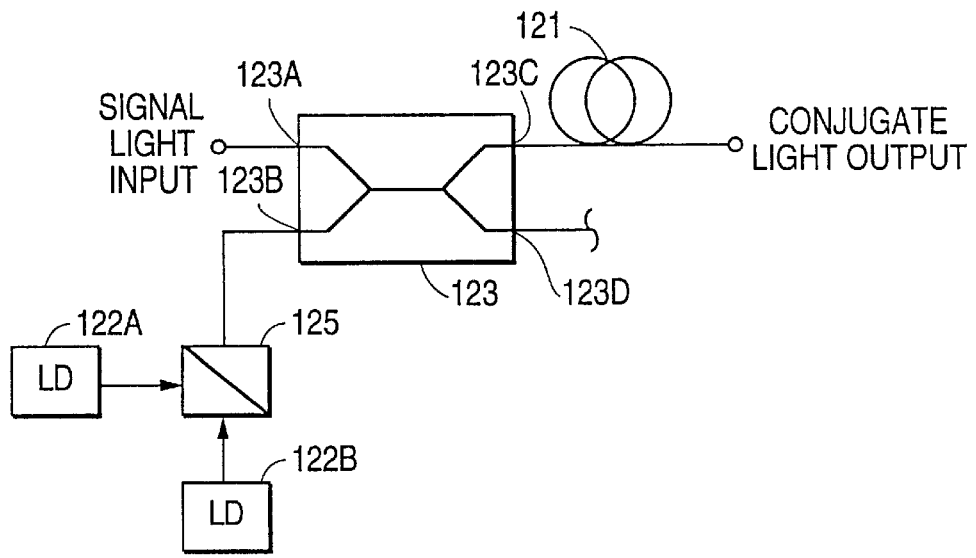
FIG. 20 is a diagram illustrating a phase conjugator according to an embodiment of the present invention.

FIG. 20 is a diagram illustrating a phase conjugator according to an embodiment of the present invention. In comparison with the phase conjugator illustrated in FIG. 2, the phase conjugator illustrated in FIG. 20 includes two laser diodes 122A and 122B as pump light sources. The laser diodes 122A and 122B output first and second pump light beams, respectively. The first and second pump light beams are each composed substantially of linear polarized waves. The first and second pump light beams are mutually combined by a polarization coupler 125 so that the planes of polarization thereof are orthogonal to each other, and the combined beam is supplied via an optical coupler 123 to an optical fiber 121. Optical fiber 121 is a nonlinear optical medium.

Preferably, the first and second pump light beams have mutually different optical frequencies, and the difference therebetween is set to be equal to or higher than a frequency corresponding to the transmission rate of a signal light beam. Also, the first and second pump light beams should be approximately the same in amplitude.

With the phase conjugator illustrated in FIG. 20, a conjugate light beam is always generated in the nonlinear optical fiber 121, whereby an optimal state of reception can be maintained despite any variation in the polarization of the signal light beam.

Figure 21:
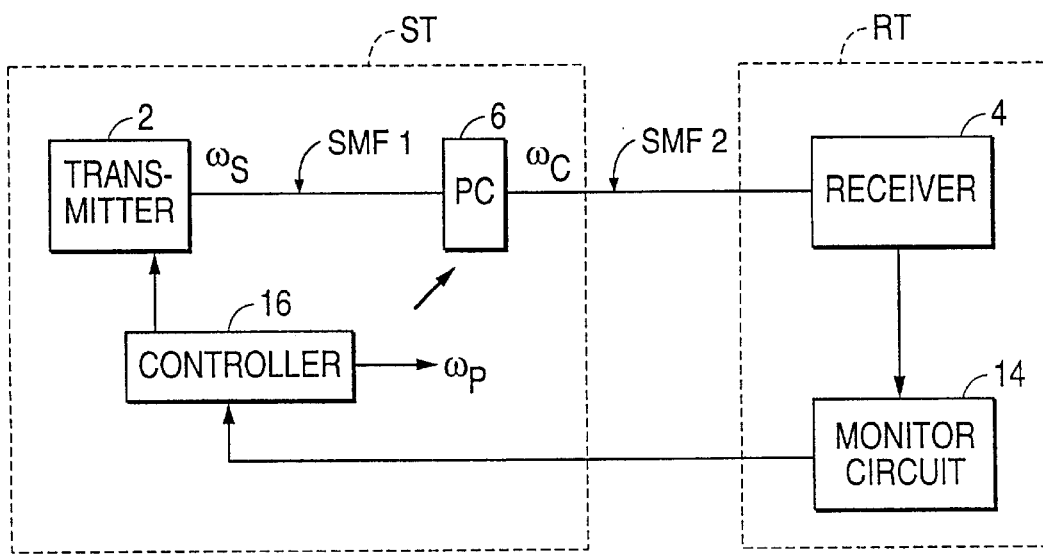
FIG. 21 is a diagram illustrating an optical communication system according to an embodiment of the present invention.

FIG. 21 is a diagram illustrating an optical communication system according to an embodiment of the present invention. Referring now to FIG. 21, a transmitter 2, a first optical fiber SMF1 and a phase conjugator 6 are included in a transmitting station ST. A second optical fiber SMF2, used as a transmission path, and a receiver 4, are included in a receiving station RT. The receiving station RT further includes a monitor circuit 14 for monitoring a parameter which indicates the reproduction quality of transmission data in the optical receiver 4. The monitor circuit 14 outputs a monitor signal therefrom. The transmitting station ST further includes a controller 16. The controller 16 receive a monitor signal from the monitor circuit 14 and executes feedback control of either the wavelength or the power of the signal light beam in the optical transmitter 2 or either the wavelength or the power of the pump light beam in the phase conjugator 6 in such a manner that the monitored parameter is optimized.

For example, the dispersion of the transmission line can be maintained at its optimal value by controlling the wavelength of the signal light beam and/or the pump light beam, and the waveform distortion derived from the dispersion and the optical Kerr effect can be adequately suppressed by controlling the power of the signal light beam and/or the pump light beam.

Figure 22:
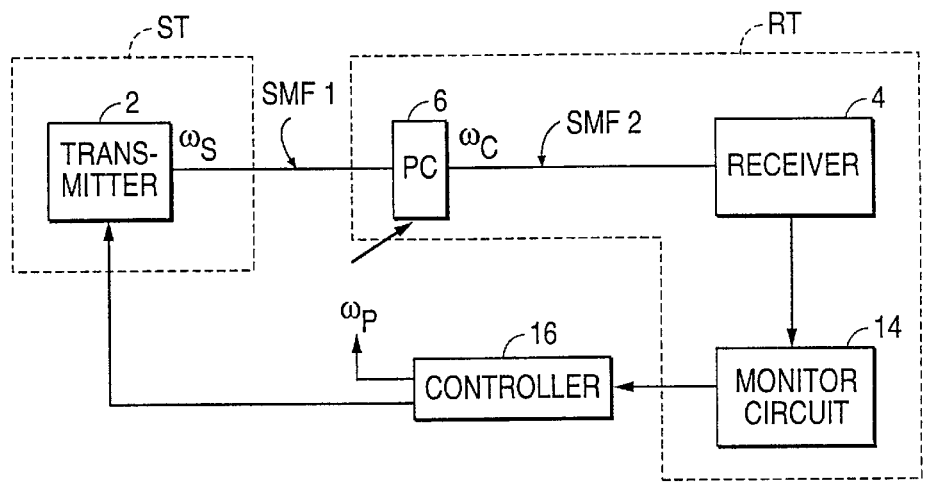
FIG. 22 is a diagram illustrating an optical communication system according to an embodiment of the present invention.

FIG. 22 is a diagram illustrating an optical communication system according to an embodiment of the present invention. Referring now to FIG. 22, a transmitter 2 is included in a transmitting station ST, and a first optical fiber SMF1 is used as a transmission line. A receiving station RT includes a phase conjugator 6, a second optical fiber SMF2, a receiver 4 and a monitor circuit 14. A controller 16 is included in the receiving station RT when an parameter to be controlled is the wavelength or the power of a pump light beam in the phase conjugator 6. When a parameter to be controlled is the wavelength or the power of a signal light beam in the light transmitter 2, the controller 16 is included in the transmitting station ST.

In the embodiments of the present invention illustrated in FIGS. 21 and 22, a monitor signal from the monitor circuit 14 can be supplied to the controller 16 via the transmission path of the relevant system. For example, a low-speed supervisory signal may be superposed on a reverse signal light beam through bi-directional transmission.

The various embodiments of the present invention described above can be applied to an optical communication system which uses wavelength division multiplexing (WDM). More specifically, various embodiments of the present invention as described above for solving problems described with reference to FIG. 16, can be applied to a wavelength division multiplexing (WDM) optical communication system.

Figure 23:
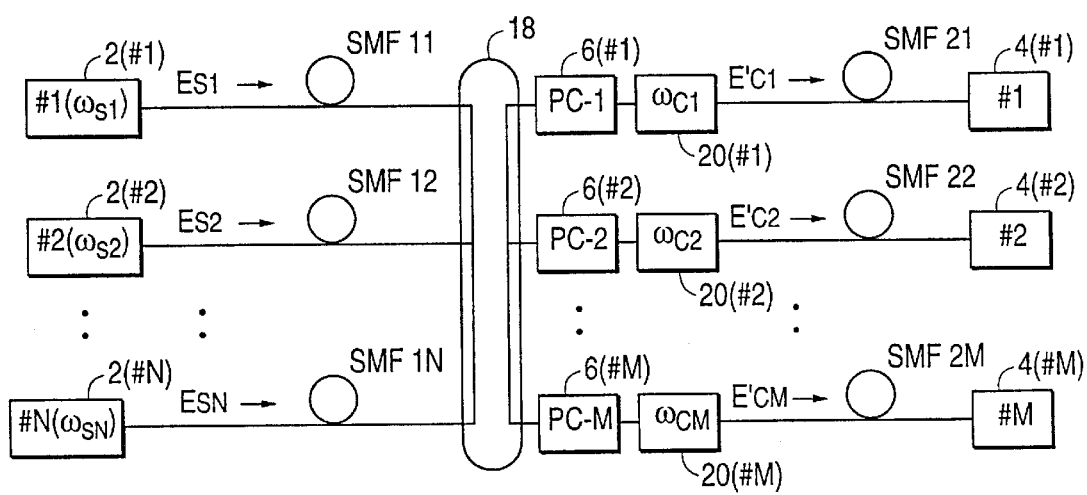
FIG. 23 is a diagram illustrating an optical communication system according to an embodiment of the invention.

More specifically, FIG. 23 is a diagram illustrating an optical communication system which uses wavelength division multiplexing (WDM), according to an embodiment of the invention. Referring now to FIG. 23, transmitters 2 (#1, #2, . . . , #N) output signal light beams $E_{s1}$, $E_{s2}$, . . . , $E_{sN}$, respectively, having different wavelengths (optical frequencies). The optical frequencies of such signal light beams are denoted by $\omega_{s1}$, $\omega_{s2}$, . . . , $\omega_{sN}$. These signal light beams are transmitted via a plurality of first optical fibers SMF11, SMF12, . . . , SMF1N and then are combined and separated by an optical multiplexer/demultiplexer 18. The optical multiplexer/demultiplexer 18 is formed of, for example, star couplers. The signal light beams thus separated are supplied to phase conjugators 6 (#1, #2, . . . , #M), respectively. The phase conjugators 6 (#1, #2, . . . , #M) generate phase conjugate light beams which correspond to at least one of the signal light beams supplied thereto. The generated phase conjugate light beams are passed through optical filters 20 (#1, #2, ..., #M), respectively, and then are transmitted to optical receivers 4 (#1, #2, ..., #M) via a plurality of second optical fibers SMF21, SMF22, ..., SMF2M, respectively. The phase conjugate light beams transmitted via the plurality of second optical fibers are denoted by $E'_{c1}$, $E'_{c2}$, ..., $E'_{cM}$ respectively.

It is assumed here that each of the first optical fibers SMF1j (j=1, 2, ..., N) has a length $L_{1j}$, a dispersion $D_{1j}$ and a nonlinearity coefficient $\gamma_{1j}$, and each signal light beam has a power $P_{1j}$. It is also supposed here that each of the second optical fibers SMF2k (k=1, 2, ..., M) has a length $L_{2k}$, a dispersion $D_{2k}$ and a nonlinearity coefficient $\gamma_{2k}$, and each phase conjugate light beam has a power $P_{2k}$. In this case, the parameters are so set that the following two conditions are satisfied.

$$D_{1j}L_{1j}=D_{2k}L_{2k}=(\text{Constant})$$

$$\gamma_{1j}P_{1j}/D_{1j}=\gamma_{2k}P_{2k}/D_{2k}=(\text{Constant})$$

In the above, the term "constant" signifies that the mean value in any section of the individual fibers is constant.

The compensation for the waveform distortion derived from each of the second optical fibers SMF2k is so set as to become optimal to the phase conjugate light beam transmitted through the band of the corresponding optical filter 20 (#k). The phase conjugate light beam $E'_{ck}$ of the channel extracted by a combination of the phase conjugator 6 (#k) and the optical filter 20 (#k) is the phase conjugate light beam of an arbitrary channel of the signal light beam or that of plural channels included in the band of the optical filter in the vicinity thereof. The channel transmitted through each optical filter is settable as desired by controlling the wavelength of the pump light beam in the phase conjugator and/or controlling the transparent wavelength of the optical filter.

This system functions as a distribution system, for example, when the second optical fiber is used as a transmission line, or as a channel exchanging (crossing) system when the second optical fiber is disposed in a receiving station or a repeater.

Figure 24:
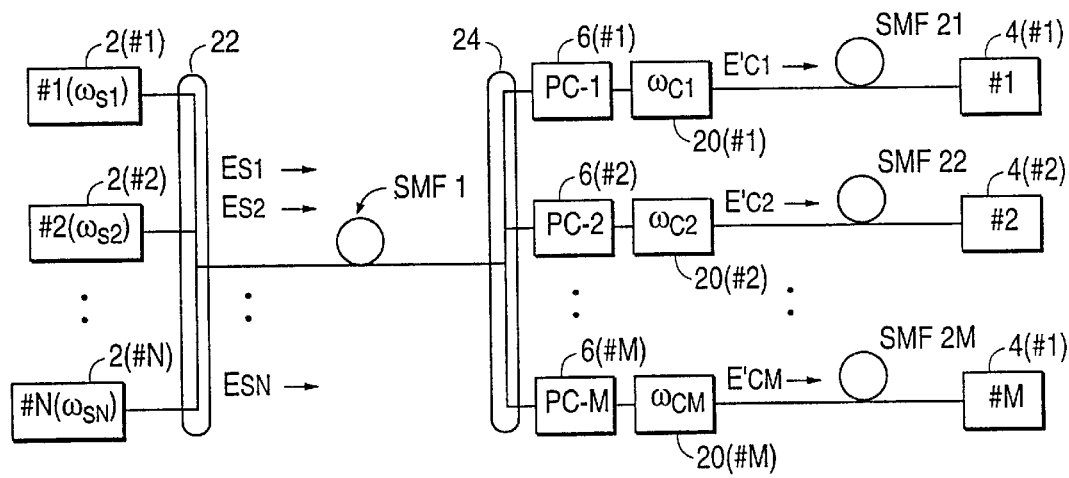
FIG. 24 is a diagram illustrating an optical communication system according to an additional embodiment of the invention.

FIG. 24 is a diagram illustrating an optical communication system according to an additional embodiment of the invention. As compared with the embodiment of the present invention illustrated in FIG. 23, the embodiment of the present invention illustrated in FIG. 24 uses a common first optical fiber SMF1 for a plurality of optical transmitters 2 (#1, #2, ..., #N). Due to such a configuration, the input end of the first optical fiber SMF1 is connected to each optical transmitter 2 (#j) via an optical multiplexer 22, while the output end thereof is connected to each phase conjugator 6 (#k) via an optical demultiplexer 24.

The dispersion in the common first optical fiber SMF1 is rendered substantially constant over the entire channels. For example, the above-described conditions can be satisfied by using, as the first optical fiber SMF1, a dispersion shifted fiber having a large dispersion, such as a 1.3 μm-band zero-dispersion fiber for a 1.55 μm-band signal light beam, or a 1.55 μm-band zero-dispersion fiber for a 1.3 μm-band signal light beam. An optimal state of reception can be obtained relative to each channel when each of the second optical fibers SMF2k satisfies the conditions of the present invention with respect to the common first optical fiber SMF1.

Therefore, as illustrated, for example, in FIG. 24, a first fiber SMF1 and each of a plurality of second fibers SMF21 through SMF2M each have an associated dispersion and optical Kerr effect. The amount of dispersion of each second fiber of the plurality of second fibers is set to be equal to the amount of dispersion of the first fiber. Also, the amount of optical Kerr effect of each second fiber of the plurality of second fibers is set to be equal to the amount of dispersion of the first fiber.

Alternatively, for each second fiber of the plurality of second fibers: (a) the ratio of the dispersion of the first fiber to the dispersion of the respective second fiber is substantially equal to the ratio of the length of the respective second fiber to the length of the first fiber, and (b) the ratio of the product of the optical frequency, the light intensity and the nonlinear refractive index of the first fiber to the product of the optical frequency, the light intensity and the nonlinear refractive index of the respective second fiber is substantially equal to the ratio of the length of the respective second fiber to the length of the first fiber.

Further, the first fiber can be divided into a plurality of sections which each have an associated dispersion and optical Kerr effect. Each second fiber of the plurality of second fibers is also divided into a plurality of sections which each have an associated dispersion and optical Kerr effect and which correspond, respectively, to the plurality of sections of the first fiber, and, for each second fiber of the plurality of second fibers. The amount of dispersion in each section of the plurality of sections of the first fiber can be set to be equal to the amount of dispersion of the corresponding section of the plurality of sections of the respective second fiber. Also, the amount of optical Kerr effect in each section of the plurality of sections of the first fiber can be set to be equal to the amount of optical Kerr effect of the corresponding section of the plurality of sections of the respective second fiber.

Moreover, the first fiber can be divided into a plurality of sections which each have an associated dispersion, length, light intensity, and nonlinear refractive index, and each second fiber of the plurality of second fibers can divided into a plurality of sections which each have an associated dispersion, length, light intensity, and nonlinear refractive index. For each second fiber of the plurality of second fibers, (a) the ratio of the dispersion in each section of the plurality of sections of the first fiber to the dispersion of the corresponding section of the plurality of sections of the respective second fiber can be set to be substantially equal to the ratio of the length of the respective section of the plurality of sections of the respective second fiber to the length of the respective section of the plurality of sections of the first fiber, and (b) the ratio of the product of the optical frequency, the light intensity and the nonlinear refractive index of each section of the plurality of sections of the first fiber to the product of the optical frequency, the light intensity and the nonlinear refractive index of the corresponding is section of the plurality of sections of the respective second fiber can be set to be substantially equal to the ratio of the length of the respective section of the plurality of sections of the respective second fiber to the length of the respective section of the plurality of sections of the first fiber.

Figure 25:
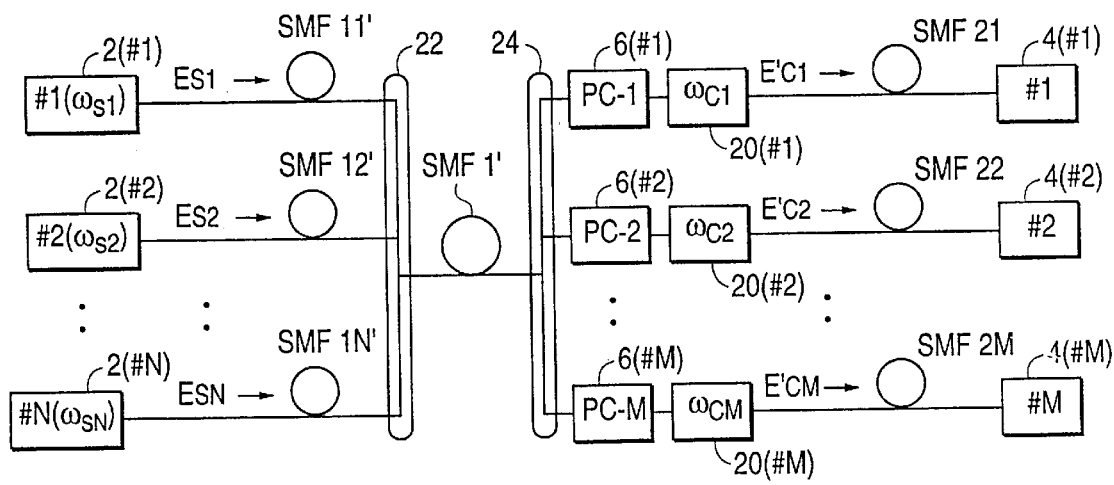
FIG. 25 is a diagram illustrating an optical communication system according to a further embodiment of the invention.

FIG. 25 is a diagram illustrating an optical communication system according to a further embodiment of the invention. Referring now to FIG. 25, first optical fibers employed here are combinations of a plurality (N) of optical fibers SMF11', SMF12', ..., SMFLN' having a relatively large dispersion, and a common optical fiber SMF1' having a relatively small dispersion. The optical fibers SMF11', SMF12', ..., SMFLN' and the optical fiber SMF1' are mutually connected via an optical multiplexer 22, while the optical fiber SMF1' and each phase conjugator 6 (#k) are mutually connected via an optical demultiplexer. It is possible to properly compensate for the waveform distortion in each channel by enabling the first and second optical fibers to satisfy the predetermined conditions, hence achieving an optimal state of reception.

Therefore, as illustrated in FIG. 25, a plurality of first fibers correspond, respectively, to a plurality of second fibers. Each first fiber of the plurality of first fibers and each second fiber of the plurality of second fibers has an associated dispersion and optical Kerr effect. The amount of dispersion of each second fiber of the plurality of second fibers can be set to be equal to the amount of dispersion of the corresponding first fiber of the plurality of first fibers. Also, the amount of optical Kerr effect of each second fiber of the plurality of second fibers can be set to be equal to the amount of dispersion of the corresponding first fiber of the plurality of first fibers.

Moreover, the ratio of the dispersion of each first fiber of the plurality of first fibers to the dispersion of the corresponding second fiber of the plurality of second fibers can be set to be substantially equal to the ratio of the length of the respective second fiber to the length of the respective first fiber. Further, the ratio of the product of the optical frequency, the light intensity and the nonlinear refractive index of each first fiber of the plurality of first fibers to the product of the optical frequency, the light intensity and the nonlinear refractive index of the corresponding second fiber of the plurality of second fibers can be set to be substantially equal to the ratio of the length of the respective second fiber to the length of the respective first fiber.

Alternatively, each first fiber of the plurality of first fibers can be divided into a plurality of sections which each have an associated dispersion and optical Kerr effect, and each second fiber of the plurality of second fibers can be divided into a plurality of sections which each have an associated dispersion and optical Kerr effect. Then, (a) the amount of dispersion of each section of the plurality of sections of a respective first fiber of the plurality of first fibers can be set to be equal to the amount of dispersion of the corresponding section of the plurality of sections of the corresponding second fiber of the plurality of second fibers, and (b) the amount of optical Kerr effect of each section of the plurality of sections of a respective first fiber of the plurality of first fibers can be set to be equal to the amount of optical Kerr effect of the corresponding section of the plurality of sections of the corresponding second fiber of the plurality of second fibers.

Alternatively, (a) the ratio of the dispersion of each section of the plurality of sections of a respective first fiber of the plurality of first fibers to the dispersion of the corresponding section of the plurality of sections of the corresponding second fiber of the plurality of second fibers can be set to be substantially equal to the ratio of the length of the respective section of the plurality of sections of the respective second fiber to the length of the respective section of the plurality of sections of the respective first fiber, and (b) the ratio of the product of the optical frequency, the light intensity and the nonlinear refractive index of each section of the plurality of sections of a respective first fiber of the plurality of first fibers to the product of the optical frequency, the light intensity and the nonlinear refractive index of the corresponding section of the plurality of sections of the corresponding second fiber of the plurality of second fibers can be set to be substantially equal to the ratio of the length of the respective section of the plurality of sections of the respective second fiber to the length of the respective section of the plurality of sections of the respective first fiber.

Figure 26:
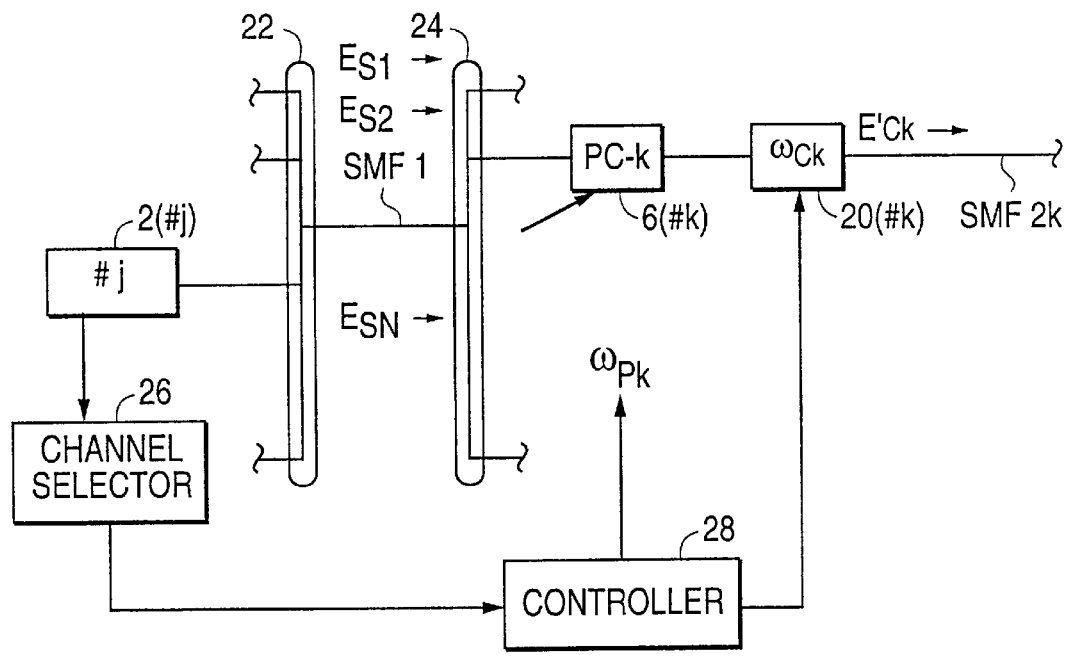
FIG. 26 is a diagram illustrating a channel selector, according to an embodiment of the present invention.

FIG. 26 is a diagram illustrating a channel selector, according to an embodiment of the present invention. Referring now to FIG. 26, a channel selector 26 is provided incidentally to each optical transmitter 2 (#j). The channel selector 26 generates a control signal in accordance with data from the optical transmitter 2 (#j). The control signal output from the channel selector 26 is supplied to a controller 28. Subsequently, the controller 28 controls, in response to the control signal supplied thereto, at least either of the wavelength of a pump light beam in a phase conjugator 6 (#k) and the characteristic of an optical filter 20 (#k) so as to select a signal light beam of a desired channel.

Figure 27:
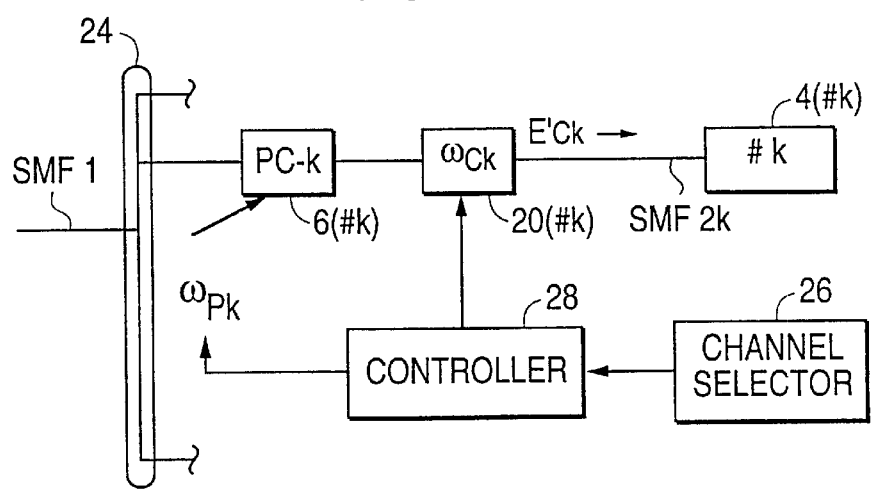
FIG. 27 is a diagram illustrating a channel selector, according to an additional embodiment of the present invention.

FIG. 27 is a diagram illustrating a channel selector, according to an additional embodiment of the present invention. Referring now to FIG. 27, a channel selector 26 is provided incidentally to each optical receiver 4 (#k) and generates a control signal in accordance with data obtained from the optical receiver 4 (#k). Subsequently, the controller 28 controls, in response to the control signal supplied thereto, at least either of the wavelength of a pump light beam in a phase conjugator 6 (#k) and the characteristic of an optical filter 20 (#k) so as to select a signal light beam of a desired channel.

According to the above embodiments of the present invention, an optical fiber communication system is capable of compensating for waveform distortion derived from GVD and optical Kerr effect. Particularly, according to various embodiments of the present invention, an optimal state of reception can be maintained despite any variation of polarization. Moreover, according to various embodiments of the present invention, it is possible to optimize the monitoring control in an optical communication system.

In this disclosure, the term "connection" signifies many types of operative connection, including (a) an optical direct connection, (b) a connection via any optical element such as an optical filter or an optical isolator, and (c) a connection after proper adjustment of polarization.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus for transmitting a light signal, comprising:
   a first fiber for transmitting the light signal therethrough;
   a phase conjugator which receives the light signal from the first fiber and produces a corresponding phase conjugate light signal; and
   a second fiber which receives the phase conjugate light signal from the phase conjugator and transmits the phase conjugate light signal therethrough, wherein
      the first and second fibers each have an associated dispersion and optical Kerr effect,
      the amount of dispersion of the first fiber is set to be equal to the amount of dispersion of the second fiber, and
      the amount of optical Kerr effect of the first fiber is set to be equal to the amount of optical Kerr effect of the second fiber.

2. An apparatus as in claim 1, further comprising:
   an amplifier positioned in the first fiber for amplifying the light signal as the light signal is transmitted through the first fiber; and
   a polarizer having a main axis of polarization substantially parallel to a plane of polarization of the light signal, and which polarizes the light signal either before or after the light signal is amplified by the light amplifier.

3. An apparatus as in claim 1, wherein the phase conjugator comprises:

a nonlinear optical medium which receives the light signal;

first and second pump light sources which produce first and second pump lights, respectively, the first and second pump lights each comprising substantially linear polarized waves; and a polarization coupler which combines the first and second pump lights into a combined light with a plane of polarization of the first light being orthogonal to a plane of polarization of the second light, the combined light being supplied to the nonlinear optical medium to interact with the light signal.

* * * * *